(12) United States Patent
Farnsworth et al.

(10) Patent No.: US 10,965,810 B1
(45) Date of Patent: *Mar. 30, 2021

(54) METHODS AND SYSTEMS FOR MULTIPLE CHANNEL AUTHENTICATION

(71) Applicant: United Services Automobile Association (USAA), San Antonio, TX (US)

(72) Inventors: Anthony Scott Farnsworth, San Antonio, TX (US); Zakery Layne Johnson, San Antonio, TX (US); Joshua S. Kerr, San Antonio, TX (US); Eric Smith, Helotes, TX (US); Charles Lee Oakes, III, Boerne, TX (US); Thomas Bret Buckingham, Fair Oaks Ranch, TX (US); Maland Keith Mortensen, San Antonio, TX (US); John Raymond Harris, San Antonio, TX (US); Joshua Samuel Leonard, San Antonio, TX (US); Vijay Jayapalan, San Antonio, TX (US); Minya Liang, McKinney, TX (US); Justin Dax Haslam, San Antonio, TX (US); Robert Barner, San Antonio, TX (US); Ross Andrew Thiele, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,905

(22) Filed: Jul. 2, 2019

Related U.S. Application Data

(63) Continuation of application No. 16/026,852, filed on Jul. 3, 2018, now Pat. No. 10,389,874, which is a (Continued)

(51) Int. Cl.
*G06F 21/00* (2013.01)
*H04M 3/42* (2006.01)
(Continued)

(52) U.S. Cl.
CPC ........ *H04M 3/42068* (2013.01); *G06F 21/30* (2013.01); *G06F 21/41* (2013.01);
(Continued)

(58) Field of Classification Search
CPC .......... G06F 21/30; G06F 21/31; G06F 21/41; G06F 21/42; G06F 21/43; H04L 63/18
See application file for complete search history.

(56) References Cited

U.S. PATENT DOCUMENTS 9,479,491 B1    10/2016    Farnsworth et al.
9,749,463 B1    8/2017    Farnsworth et al.
(Continued)

OTHER PUBLICATIONS

U.S. Appl. No. 16/026,852, filed Jul. 3, 2018, Methods and Systems for Multiple Channel Authentication.
(Continued)

*Primary Examiner* — Edward Zee

(57) ABSTRACT

Methods and systems for multiple channel authentication are described. In one embodiment, a request for an interaction is initiated from within a mobile application. The request may
(Continued)

include authentication information and contextual information relating to a current exchange between the mobile application and an organization. The user may be authenticated with the authentication information and the request may be routed to a representative based on the contextual information to continue the exchange.

16 Claims, 22 Drawing Sheets

Related U.S. Application Data continuation of application No. 15/684,813, filed on Aug. 23, 2017, now Pat. No. 10,033,861, which is a continuation of application No. 15/299,064, filed on Oct. 20, 2016, now Pat. No. 9,749,463, which is a continuation of application No. 14/019,669, filed on Sep. 6, 2013, now Pat. No. 9,479,491.

(51) Int. Cl.
    *G06F 21/41*     (2013.01)
    *G06F 21/30*     (2013.01)
    *H04M 3/436*     (2006.01)
    *H04L 29/06*     (2006.01)

(52) U.S. Cl.
    CPC .......... *H04L 63/18* (2013.01); *H04M 3/4365* (2013.01); *H04L 63/0853* (2013.01); *H04L 2463/082* (2013.01)

(56) References Cited

U.S. PATENT DOCUMENTS

| | | |
|---|---|---|
| 10,033,861 B1 | 7/2018 | Farnsworth et al. |
| 10,389,874 B1 | 8/2019 | Farnsworth et al. |
| 2008/0240376 A1 | 10/2008 | Conway |
| 2010/0319063 A1* | 12/2010 | Koppolu ............. H04L 65/1073 726/8 |
| 2014/0126714 A1 | 5/2014 | Sayko |
| 2014/0161241 A1* | 6/2014 | Baranovsky ........ H04M 3/2218 379/142.05 |
| 2014/0250512 A1 | 9/2014 | Goldstone et al. |

OTHER PUBLICATIONS

U.S. Appl. No. 15/684,813, filed Aug. 23, 2017, Methods and Systems for Multiple Channel Authentication.
U.S. Appl. No. 15/299,064, filed Oct. 20, 2016, Methods and Systems for Multiple Channel Authentication.
U.S. Appl. No. 14/019,669, filed Sep. 6, 2013, Methods and Systems for Multiple Channel Authentication.

\* cited by examiner

METHODS AND SYSTEMS FOR MULTIPLE CHANNEL AUTHENTICATION

CROSS-REFERENCE TO RELATED APPLICATIONS

The present application is a continuation of U.S. application Ser. No. 16/026,852 entitled "METHODS AND SYSTEMS FOR MULTIPLE CHANNEL AUTHENTICATION," filed on Jul. 3, 2018, now allowed; which is a continuation of U.S. application Ser. No. 15/684,813 entitled "METHODS AND SYSTEMS FOR MULTIPLE CHANNEL AUTHENTICATION," filed on Aug. 23, 2017, issued as U.S. Pat. No. 10,033,861 on Jul. 24, 2018; which is a continuation of U.S. application Ser. No. 15/299,064 entitled "METHODS AND SYSTEMS FOR MULTIPLE CHANNEL AUTHENTICATION," filed on Oct. 20, 2016, issued as U.S. Pat. No. 9,749,463 on Aug. 29, 2017; which is a continuation of U.S. application Ser. No. 14/019,669 entitled "METHODS AND SYSTEMS FOR MULTIPLE CHANNEL AUTHENTICATION," filed on Sep. 6, 2013, issued as U.S. Pat. No. 9,479,491 on Oct. 25, 2016, the contents of each are hereby incorporated by reference in their entireties for all purposes.

TECHNICAL FIELD

Various embodiments of the present disclosure generally relate to authentication. More specifically, various embodiments of the present disclosure relate to methods and systems for multiple channel authentication.

BACKGROUND

Organizations strive to ensure secure and convenient user access to services and accounts. With the proliferation of identity theft and the growing emphasis on convenience, organizations are forced to find a balance between sufficient security procedures and accessibility of services/accounts. Many systems sacrifice convenience and efficiency of use for security measures, such as by requesting authentication information several times during the course of an interaction with the user. As such, techniques are needed that provide for improved security without sacrificing ease of use and time for the customer.

SUMMARY

In some embodiments, a method and system of user authentication is described. In some embodiments, a method includes receiving authentication information of a user into a mobile application that allows the user to engage in activities through the mobile application on a mobile device. The user may be authenticated to the mobile application, and in response to receiving a request from the user, a voice and data call to an organization may be initiated from within the mobile application. Initiating the voice and data call may include transferring the authentication information in connection with the voice and data call to allow pass-through authentication to a representative of the organization.

The method may further include determining whether a connection between the mobile device and a communications network can support the voice and data call. In some embodiments, the method includes indicating, to the user, that the representative of the organization could not be contacted through the voice and data call and presenting additional channels for the user to communicate with the organization. The additional channels may include at least one of: text messaging, a voice call, chat, web, video call, or electronic mail. Initiating the voice and data call may further include transferring, in connection with the voice and data call, data related to existing or prior activities on the mobile device. The data related to the activities may comprise a webpage or a view that the user was accessing within the mobile application. The data related to the activities may include media (e.g., insurance document, photographs of an accident, etc.) relating to the activities.

In some embodiments, the voice and data call is routed based on a content of the data related to the activities the user was engaging in prior to the voice and data call. In other embodiments, the voice and data call is routed based on an assumption of user intent, where the assumption of user intent is determined using predictive analytics (e.g., based on what the user has done in the past, what other users have done in similar situations, patterns, etc.). The voice and data call may be suspended when the user answers an incoming legacy phone call on the mobile device. After the voice and data call has ended, the user may be returned to the activity within the mobile application that the user was engaging in prior to the voice and data call. The method may further include presenting information relating to the representative to the user.

In other embodiments, a computerized method may include receiving authentication information from a user on a first channel; authenticating the user on the first channel thereby initiating a session between the user and an organization; allowing the user to engage in activities with the organization through the first channel; receiving a request to communicate with the user on a second channel; and transferring the session to the second channel in response to receiving the request. Transferring the session to the second channel may include passing authentication information to authenticate the user to the second channel. Transferring the session to the second channel may further include transferring data relating to the activities the user was engaging in prior to receiving the request to transfer the session.

In some embodiments, the first channel and the second channel are not the same type of channel. The types of channels may include: a mobile application, a voice and data call, a voice call, a webpage, a web portal, a mobile device, ATM, watch, vehicle, television, game console, connected smart devices, and a personal computer. In some embodiments, the first channel is a mobile application and the second channel is voice and data call with a representative of the organization. The voice and data call may be initiated from within the mobile application. The user may be authenticated to the second channel using the authentication information.

A method may include receiving a request for a combined voice and data call initiated from within a mobile application. The request may include authentication information and contextual information relating to a current exchange between the mobile application and an organization. The user may be authenticated with the authentication information and the combined voice and data call may be routed to a uniquely skilled representative based on the contextual information to continue the current exchange. In some embodiments, the method may further include displaying the contextual information, the authentication information, and a method of authentication (e.g., PIN, username/password, biometric scan, etc.) on a screen to the representative, where the contextual information may include an activity of the mobile application.

The activity may include one of the following: submitting an insurance claim, applying for a loan, transferring money, applying for insurance coverage, checking a bank statement, or setting up a new financial account. In some embodiments, the method further includes determining that the uniquely skilled representative is currently unavailable, indicating this to the user, and suggesting alternative channels to continue the interactive exchange.

While multiple embodiments are disclosed, still other embodiments will become apparent to those skilled in the art from the following detailed description, which shows and describes illustrative embodiments. As will be realized, embodiments of the present disclosure are capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

Embodiments of the present disclosure will be described and explained through the use of the accompanying drawings in which.

Figure 1:
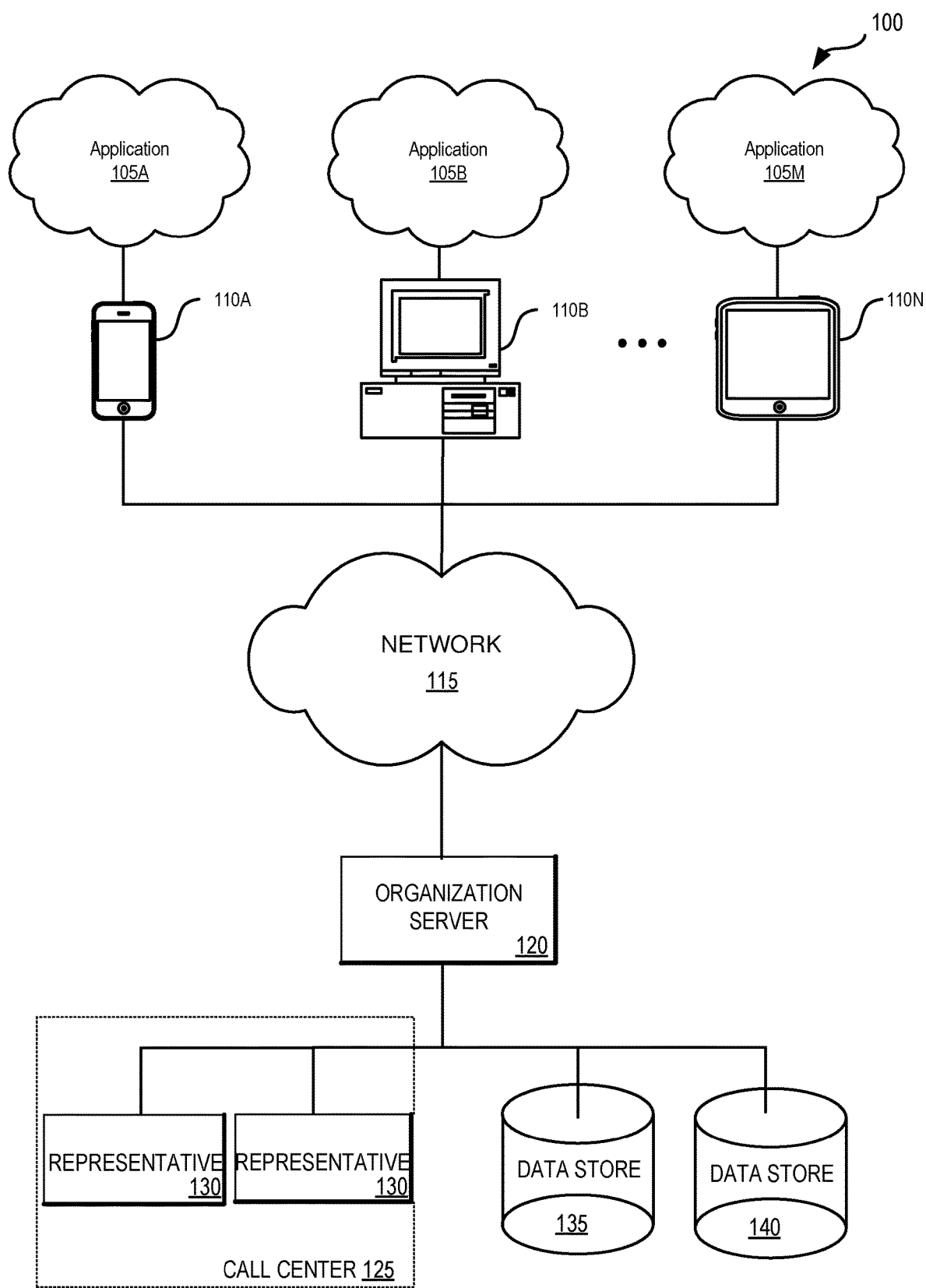
FIG. 1 illustrates an example of an operating environment in which a user may be authenticated in accordance with various embodiments of the disclosure.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to authenticating a user. More specifically, various embodiments of the present disclosure relate to authenticating a user on a second channel with authentication information from a first channel during a single session.

Organizations provide many methods for customers or users to communicate with the organization. For example, many organizations allow users to communicate with the organization via a website, mobile application, electronic messaging, and chat using various devices, such as a mobile device, vehicle, or any other device equipped with internet connectivity capability.

During an interaction with an organization, the user may want to communicate with the organization in a different manner (e.g., user wishes to speak with a representative of the organization while logged onto mobile application). In traditional systems, the user is required to re-authenticate at least one time prior to or after switching or transferring to a new communication method, such as by answering repetitive questions or providing other identifying information. For example, the user may have provided a username and password to logon to the organization, entered a member number to switch channels to an interactive voice response (IVR) system after initiating a phone call, and answered a series of security questions after being transferred to a representative. Once the user has successfully re-authenticated, the user is generally asked to provide contextual information, such as the general area of concern, the specific reason for calling, steps or procedures the user has taken to solve the problem, etc. This repetitious approach may cause users to become irritated and dissatisfied.

This disclosure is directed to an approach for multiple channel authentication methods and systems. In some embodiments, authentication and contextual information is transferred from a first channel to a second channel during a session. In some embodiments, a user provides authentication information, beginning a session and allowing the user to interact with an organization on a first channel (e.g., accessing a website on a personal computer, a mobile application on a mobile device, etc.). During the same session, the user may transfer the session to a second channel (e.g., a voice and data call with a representative, etc.). At least authentication, and possibly contextual information from the user's current session on the first channel may be transferred to the second channel to authenticate the user to the second channel. If transferred, the contextual information may direct the user to the correct representative, webpage, function, etc. on the second channel.

In a specific example, a user provides authentication information credentials to logon to a mobile application installed on a user mobile device. For purposes of this disclosure, authentication information, authentication credentials, and authentication data are used interchangeably. While the user is using the mobile application, the user may be presented with an option to call a representative from within the mobile application. If the user selects this option, the mobile application may call the representative using Voice over Internet Protocol ("VoIP") or other comparable technology, transferring authentication information from the mobile application. By using the information provided by the user during the session, the user is saved the trouble of providing authentication information for a second time. The mobile application may also transfer contextual information relating to the user's activities to the organization. For example, the mobile application may provide a webpage or function the user was accessing in the mobile application prior to initiating the call. This capability may provide the representative with insight into the user's activities and reason for calling.

Examples of channels include modes of communication (e.g., a communications network) for exchanging data between devices. Devices may include, but are not limited to, computing devices such as tablets, personal computers, smartphones, point of sale devices, ATMs, connected smart devices such as refrigerators, watches, and laptops; telephones such as landline telephones or mobile phones; and face-to-face contact such as between a user and an employee at a brick and mortar building of the organization. Channels may also include software and firmware associated with the devices and communications devices such as web portals, applications, networks, mobile applications, and instant messaging systems. Channels may also include hardware associated with the computing devices and telephones, such as the network hardware, credit card scanners, and retinal scanners. Channels allow the user to engage in activities with an organization. For example, a user may use a web portal or mobile application (i.e., a channel) to engage in activities, such as viewing an account, trading funds, purchasing insurance, submitting or processing a negotiable instrument.

Users may interact with the organization via channels during one or more sessions. A session may be an interactive exchange defined by a beginning interaction, such as logging into an account, and an ending interaction such as logging out. In some embodiments, sessions between the user and the organization may be contiguous time periods of interaction or related interactions that occur over a series of distinct time periods. In another example, a session may be a phone call, which begins with a user calling the organization and ends when the call is terminated. One or more activities may take place during a single session. For example, a mobile application account session may begin with the user logging in using a username/password, completing several activities, such as checking an account balance, ordering a new credit card, and transferring funds, and ending the session by logging out. A session may take place through a single channel. In some embodiments, a session may include interactions over multiple channels by porting a session from one channel, such as a mobile application, onto a second channel, such as a voice and data call.

While this disclosure discusses the specific example of information being transferred from a mobile application to a representative using a voice and data call, the concepts are equally applicable to other types of transfers. Further, this disclosure discusses the specific examples of authentication information and contextual information. However, this disclosure contemplates the transfer of other information besides or in addition to authentication information and contextual information from one channel to another channel.

In the following description, for the purposes of explanation, numerous specific details are set forth in order to provide a thorough understanding of embodiments of the present disclosure. It will be apparent on reading the disclosure, however, to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of an operating environment 100 in which some embodiments of the present disclosure may be used. As illustrated in FIG. 1, operating environment 100 may include applications 105A-105N running on one or more user devices 110A-110M (such as a mobile device, a mobile phone, a tablet computer, a mobile media device, a mobile gaming device, a vehicle-based computer, a dedicated terminal, a public terminal, a kiosk, etc.). These user devices can include mechanisms for receiving and sending traffic by connecting through network 115 to organization server 120, call center 125, representatives 130, data stores 135 and 140. For example, user devices 110A-110M may run one or more applications or clients 105A-105N that allow a user to interact with organization server 120. Such applications may provide access to information such as information stored in data stores 135 and 140.

In addition, user devices 110A-110M can include network communication components that enable the user devices 110A-110M to communicate with network 115 or other electronic devices by transmitting and receiving wireless signals using licensed, semi-licensed or unlicensed spectrum over network 115. In some cases, network 115 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Network 115 can also include third-party communications networks, such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network, or other communications networks.

Organization server 120 may be a web server (e.g., HTTP server) that is used to serve static or dynamic content such as websites and may be communicably connected to one or more application servers for dynamic content processing. The data stores 135 and 140 can be used to manage storage and access to data. User contact with organization server 120 may occur through sessions (e.g., interactions devoted to a period of contact through one or more channels). Organization server 120 may be associated with a membership organization, and the users may be members or potential members of the membership organization. The organization may be a financial institution, or any kind of entity providing any type of service.

Data stores 135 and 140 may be a data repository of a set of integrated objects that are modeled using classes defined in database schemas. Data store may further include flat files that can store data. Data stores 135 and 140 may store information about users, including employment information, account balances, credit ratings, home ownership information, annual salary, length of membership, and/or other information. Organization server 120 and/or other servers may collect and/or access data from the data stores.

Call center 125 may be a centralized office including representatives 130 who exchange communications with customers. Representatives 130 may provide product support or answer inquiries from users by voice only calls, chat, fax, instant messaging, voice and data phone calls (using e.g., VoIP), electronic messaging, etc. In some embodiments, call center 125 may include workstations for each representative and telephone headsets connected to a telecom switch.

Representatives 130 may have access to a computer system associated with the organization or authorized third parties and may access the data stores 135 and 140 for account information, user information, security information, and other stored information. In addition, third parties may provide information relating to the user such as the location of the user, a credit score of the user, or any other information.

Figure 2:
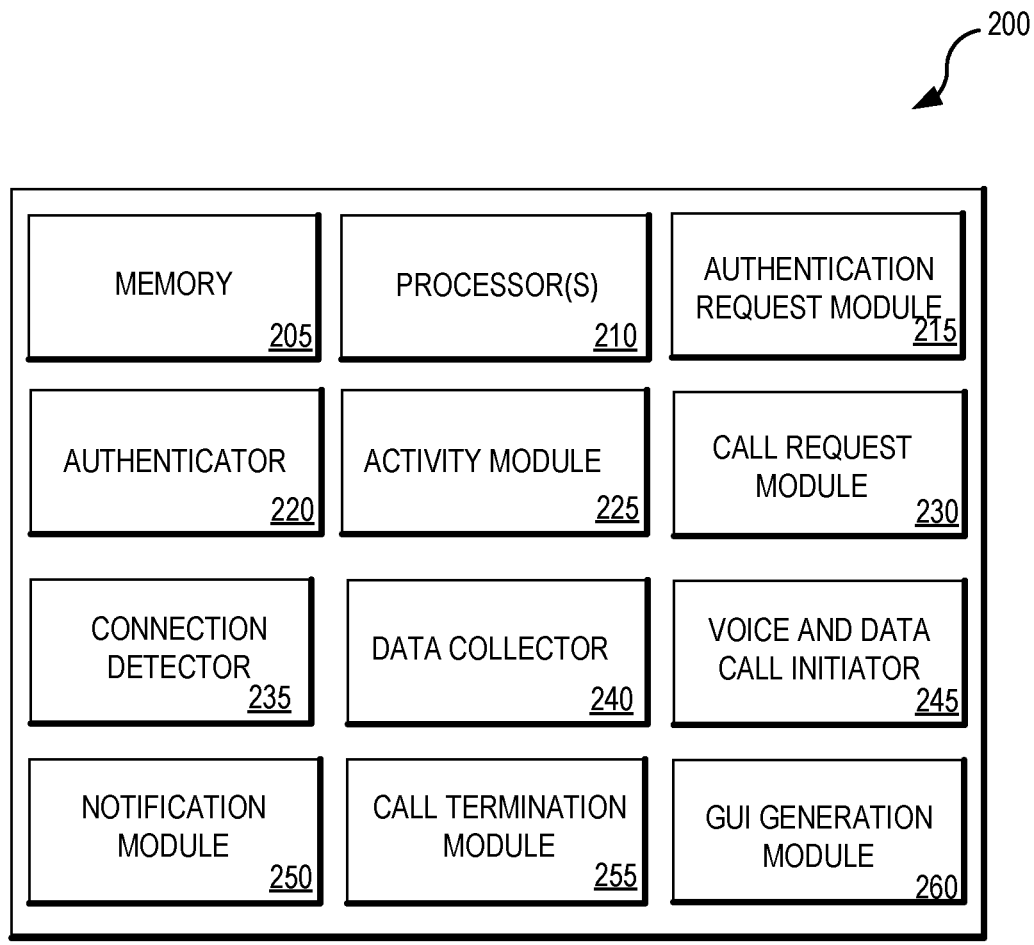
FIG. 2 is a block diagram illustrating components that can be included in an authentication system in accordance with various embodiments of the disclosure.

FIG. 2 is a block diagram illustrating components that can be included in a system such as system 100. For example, the components discussed in relationship to FIG. 2 may be used in connection with a mobile application that allows the user to access accounts or other aspects of the organization, and further allows the user to engage in a voice and data call with a representative of the organization without requiring the user to re-authenticate.

According to the embodiments shown in FIG. 2, system 200 may include memory 205, processor(s) 210, authentication request module 215, authenticator 220, activity module 225, call request module 230, connection detector 235, data collector 240, voice and data call initiator 245, notification module 250, call termination module 255, and Graphic User Interface (GUI) generation module 260. Other embodiments of the present disclosure may include some, all, or none of these modules and components along with other modules, applications, and/or components. The modules and components illustrated in FIG. 2 may be hardware, firmware, or software or a combination. Still yet, some embodiments may incorporate two or more of these modules into a single module and/or associate a portion of the functionality of one or more of these modules with a different module.

Memory 205 can be any device, mechanism, or populated data structure used for storing information. In accordance with some embodiments of the present disclosure, memory 205 can encompass any type of, but is not limited to, volatile memory, nonvolatile memory and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of authentication request module 215, authenticator 220, activity module 225, call request module 230, connection detector 235, data collector 240, voice and data call initiator 245, notification module 250, call termination module 255, and GUI generation module 260.

Authentication request module 215 may be configured to receive a request for authenticating a user to a channel such as to an application or a device. For example, authentication request module 215 may request the user to provide authentication information, such as, a personal identification number (PIN) or username/password to authenticate the user to the mobile application. Other authentication information may include biometrics (e.g., voice, fingerprint, behavioral), device fingerprint, gestures, patterns, and static information relating to the user.

Authenticator 220 may be configured to receive the authentication information from authentication request module 215 and to authenticate the user to the application or device, allowing the user to engage in activities with the organization through the application or device. For example, authenticator 220 may verify the authentication information provided by the user and provide access to the mobile application upon verification.

Activity module 225 may be configured to receive requests from the user to engage in one or more activities with the organization after the user is authenticated by authenticator 220. The request for an activity may be received by the organization through channel communication module 315 during a session with the user. Activities may include user interactions with the organization such as viewing a webpage, transferring funds, accessing an account, purchasing insurance, depositing funds, opening an account, paying a bill, and requesting a line of credit or a credit card. Due to regulatory and/or business restrictions, users may engage in some activities only via specific channels.

Call request module 230 is configured to receive a request for a voice and data call to the organization. For example, the user may be attempting to transfer funds using the mobile application and select an option to speak with a representative. The mobile application may include a webpage, link or other place for the user to select "CALL A REPRESENTATIVE." A selection of the option to call the representative may initiate a call by the voice and data call initiator 245 from within the mobile application. In some embodiments, the "CALL A REPRESENTATIVE" selection may push a notification to the call center to have a representative initiate a call to the user.

Connection detector 235 may be configured to receive the call request from call request module 230 and detect, receive, and/or determine whether a connection between the mobile device and a communications network can support a voice and data call. To establish a voice and data call, a connection with sufficient bandwidth may be needed. If an adequate connection is not available, the user may be notified that a voice and data call is not possible and may be presented with alternative communication options such as text messaging or a voice only call. Connection detector 235 may communicate the connection availability information to voice and data call initiator 245. In some embodiments, the connection detector 235 may detect that a network connection sufficient to support a voice and data call is available.

Data collector 240 may be configured to collect authentication information, contextual information, and/or other data from the user's session with the application such as information from the activity module 225. Authentication information may include the authentication information supplied by the user to logon to the mobile application, or it may include other data gathered by or provided to the mobile application that can be used to authenticate the user (e.g., biometric information, gestures, patterns, static information relating to the user, etc.). Authentication information may be used by the organization to authenticate the user to the second channel without requiring the user to re-enter, repeat, re-supply or otherwise provide additional authentication information on the new channel.

Contextual information may include, for example, the channel from which the call was initiated (e.g., mobile application from the user's mobile device), the webpage or feature of the mobile application from which the call selection was made, or other information identifying the activity that the user was engaging in prior to selecting the link to initiate the call to the representative. Contextual data may be used by the organization to more efficiently understand the reason for the call and to direct the user's call. In some embodiments, other data may be collected such as pictures, documents, etc. The data collected by data collector 240 may be transferred to the organization with the initiation of the voice and data call via the voice and data call initiator 245.

Voice and data call initiator 245 may be configured to initiate a voice and data call from within the application after receiving the request from the call request module 230. In some embodiments, voice and data call initiator 245 cannot initiate the voice and data call until a sufficient network (e.g., one that is capable of supporting VoIP) is available as indicated by connection detector 235. If a sufficient network is unavailable, then the organization or mobile application may suggest a voice only call, chat, instant message, or other method of communication.

Assuming an adequate network connection, in connection with the voice call, data collected by data collector 240 may be transmitted to the organization and may be received by organization server 120. As discussed, the data may include authentication data. Authentication data may include the authentication information provided by the user in authenticating the user to the mobile application (e.g., PIN, username/password, fingerprint, etc.). These authentication information may be used in authenticating the user to the organization. Other data may be transferred such as a phone number, device fingerprint, browser settings, etc. Data sent by voice and data call initiator 245 may include contextual information. In some embodiments, the upfront processes verify the user's authentication information sent in connection with the voice and data call and no further authentication is necessary. In other embodiments, the representative verifies the user's authentication information. The user may be authenticated to various levels depending upon the authentication information provided. The authentication level may be indicated to the representative.

In some embodiments, data sent to a representative identifies that the user has been authenticated and may include information indicating the information provided by the user to be authenticated, the type of information provided by the user (e.g., PIN), the device or medium the authentication information was provided to, etc. In some embodiments, the session identification number may be assigned when the user is authenticated to the first channel. The session identification number and a PIN may be sent to the representative in connection with the voice and data call. The representative may use session identification and the PIN to view the user's contextual information (e.g., a webpage or view).

Contextual information may be used by the organization to determine where to route the call. Contextual information may include the channel from which the call was initiated, the activity the user was engaging in, a webpage, view and/or a document/media relating to the activity (e.g., insurance claim, photos of an accident, account statement, etc.). The activities of the user are examined to determine a uniquely skilled representative to receive the call. Availability of the uniquely skilled may be determined. For example, if the user was attempting to transfer funds from one account to a second account, and selected the option to call a representative on the account transfer page, contextual information identifying that the user was on the transfer money page of the mobile application may be transmitted to the organization via the voice and data call, allowing the organization to route the call to a representative or group of representatives specializing in account transfers (if necessary). In some embodiments, the contextual information may be transferred to a representative and displayed on the representative's screen. In this way, the representative may more quickly understand the user's question or situation.

In some circumstances, the contextual information may not adequately identify the nature of the call. The call may instead be routed to an interactive voice response (IVR) system for further processing. In some embodiments, the user may be authenticated using the authentication information transferred with the call even if the call goes to the IVR system. Thus, instead of providing authentication information, the user is automatically authenticated and the IVR system may ask questions only to determine which representative is suited to assist the user. After the IVR system determines the proper representative and routes the call, the contextual information may be provided to the representative.

Notification module 250 may be configured to receive and indicate availability information relating to representatives from the organization or connection status. Notifications may be received via text message, the mobile application, electronic message, etc. For example, information regarding wait times may be provided and displayed on a user interface. In some embodiments, if the wait is over a certain amount of time for a particular representative, the notification module may suggest a different option such as an instant message, chat, or electronic messaging. In some embodiments, upon detection of an insufficient network connection by connection detector 235, notification module 250 may be configured to notify the user that a voice and data connection could not be established. Notification module 250 may be configured to notify the user of alternative communications such as a voice only call, instant message, etc.

Notification module 250 may be further configured to present information relating to the representative assigned to answer the call. For example, the user may be notified of the representative's name, area of expertise, years of service, and home town. This may create a more personal experience for the user.

Call termination module 255 may be configured to return the user to the first channel (e.g., the mobile application) after the voice and data call is competed. In some embodiments, the user's activity on the first channel is suspended while the user is interacting on the second channel. The user may be returned to the previous function, webpage, or activity once the voice and data call is over. In some embodiments, the user may view updates to the user's account from the representative in near real-time while on the voice and data call with the representative.

GUI generation module 260 can generate one or more GUI screens that allow for interaction with a user. In at least one embodiment, GUI generation module 260 generates a graphical user interface receiving and/or conveying information to the user, and allowing a user to view accounts, report losses, track claims status, set preferences, and receive notifications.

Figure 3:
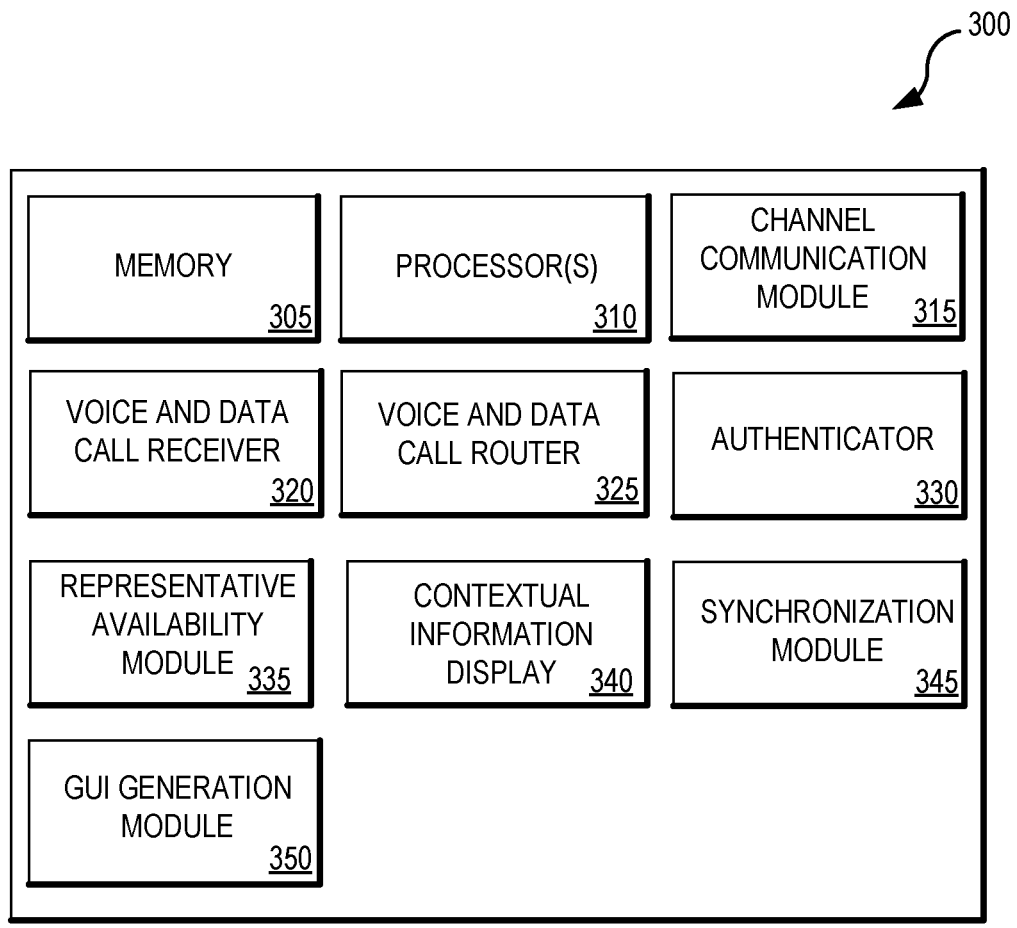
FIG. 3 is a block diagram illustrating components that can be included in an authentication system in accordance with various embodiments of the disclosure.

According to the embodiments shown in FIG. 3, system 300 may include memory 305, processor(s) 310, channel communication module 315, voice and data call receiver 320, voice and data call router 325, authenticator 330, representative availability module 335, contextual information module 340, synchronization module 345, and GUI generation module 350. Other embodiments of the present disclosure may include some, all, or none of these modules and components along with other modules, applications, and/or components discussed relating to FIG. 2. The modules and components illustrated in FIG. 3 may be hardware, firmware, or software or a combination. Still yet, some embodiments may incorporate two or more of these modules into a single module and/or associate a portion of the functionality of one or more of these modules with a different module.

Memory 305 can be any device, mechanism, or populated data structure used for storing information. In accordance with some embodiments of the present disclosure, memory 305 can encompass any type of, but is not limited to, volatile memory, nonvolatile memory and dynamic memory. For example, memory 305 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 305.

Memory 305 may be used to store instructions for running one or more applications or modules on processor(s) 310. For example, memory 305 could be used in one or more embodiments to house all or some of the instructions needed to execute the functionality of channel communication module 315, voice and data call receiver 320, voice and data call router 325, authenticator 330, representative availability module 335, contextual information module 340, synchronization module 345, and GUI generation module 350.

Channel communication module 315 is configured to exchange communication between the organization and users through various channels. Users may interact with the organization via the channel communication module 315 during one or more sessions.

Voice and data call receiver 320 is configured to receive voice and data calls initiated by the voice and data call initiator 245. The call may include authentication credentials and contextual information as discussed above.

Voice and data call router 325 may be configured to analyze the data received in connection with the voice and data call and route the call based on the data and routing rules defined by the business. For example, the call may be routed directly to a representative if the data includes contextual information regarding the context of the call (e.g., the webpage from which the call was initiated from). If sufficient data is not provided or cannot be determined by the contextual information, then the call may be routed to a common number or to the IVR system to determine where the call should be routed.

Authenticator 330 may be configured to authenticate the user at the organization using information transferred during the voice and data call. Authenticator 330 may use authentication data used to authenticate the user to the first channel or other authentication information transferred in connection with the voice and data call to authenticate the user to the second channel. The authentication may occur when the call is received by the organization (e.g., at the IVR system, at the representative, or prior to reaching the IVR system or representative). Using this method of authentication, the user will not be required to re-supply authentication credentials in the same session.

In some embodiments, if the user is participating in a risky activity such as transferring a large sum of money to a foreign official, the user may be asked to provide additional authentication information determined by business rules. However, for typical transactions, additional authentication will be unnecessary.

Representative availability module 335 is configured to receive call requests and determine whether a representative is available. Representative availability module 335 may communicate associated representative availability (e.g., wait times) to the notification module 250 to notify the user.

Contextual information display module 340 is configured to receive contextual information relating to the voice and data call and to display this information on the representative's screen. In some embodiments, the representative is provided only a reference to the webpage the user is viewing. In other embodiments, the representative may view the actual webpage that the user is viewing. By providing the contextual information, the representative can better assist the user.

Synchronization module 345 may be configured to allow multiple parties to be engaged simultaneously on different devices. In some embodiments, the multiple users and/or the representative may be viewing the same screen. The second user may be authenticated by the first user or may need to supply additional authentication information. For example, if a spouse and a representative are discussing a feature relating to a joint account, the spouse may wish to engage the other spouse ("second spouse") in the conversation. Synchronization module 345 may be configured to initiate a voice and data call with the second spouse. Once the second spouse has been authenticated, contextual information may be transmitted to the other spouse's device, allowing the second spouse to co-browse with the spouse and the representative.

GUI generation module 350 may be configured to generate one or more GUI screens that allow for interaction with a user. In at least one embodiment, GUI generation module 350 generates a GUI allowing a representative to view the contextual data received, and information relating to the user (e.g., accounts, insurance coverage, losses, claims status, etc.). The GUI generation module 350 may be configured to generate other GUI screes that otherwise receive or convey information to the representative.

Figure 4:
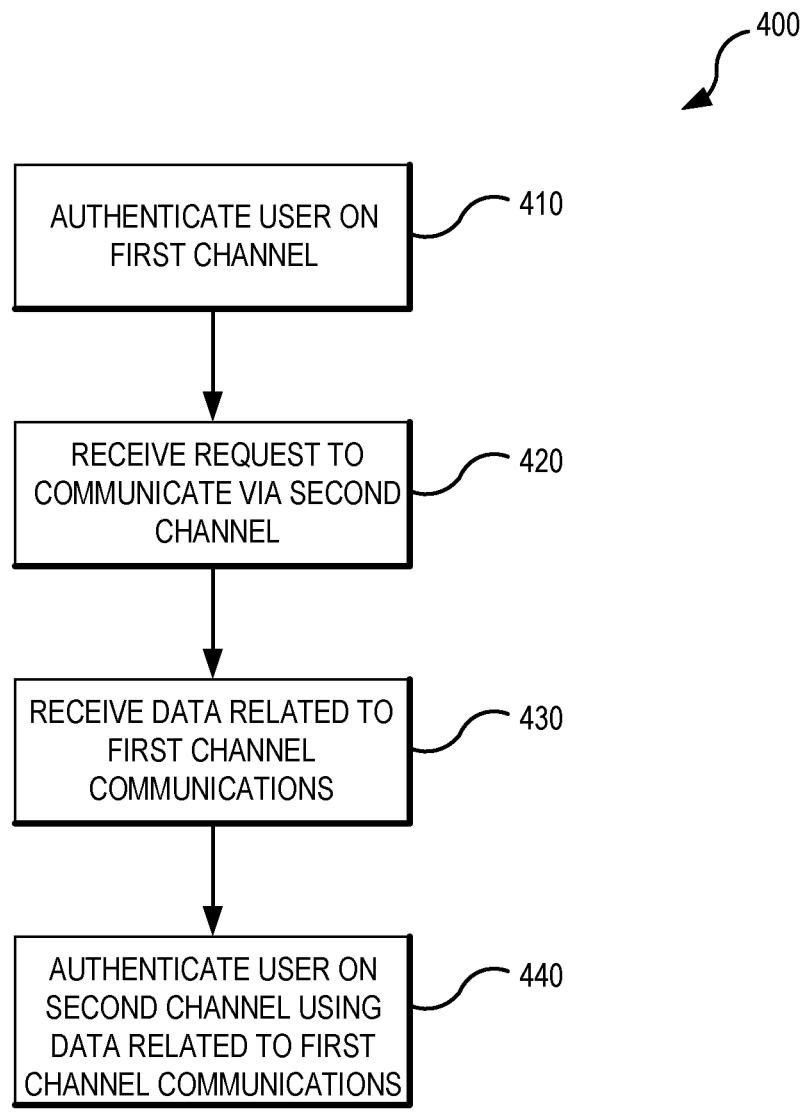
FIG. 4 is a flowchart illustrating a set of operations for authenticating a user in accordance with various embodiments of the disclosure.

FIG. 4 is a flowchart illustrating a set of operations 400 for automatically authenticating the user on a second channel during the same session. In some embodiments, fewer than all of the operations are performed, whereas in other embodiments additional operations are performed. Moreover, in some embodiments, the operations may be performed in different orders. The operations can be performed by various components in FIG. 2 and FIG. 3.

Authentication operation 410 receives authentication information and verifies the information to authenticate the user to a first channel such as a mobile application. Authentication may include receiving a username/password combination, a PIN, token, pattern, static personal information, gestures, voice, etc. Authenticating the user to the channel may begin a session with the user.

Transfer request operation 420 receives a request to transfer the session to a second channel, such as a voice and data call. The request may be made by a user selecting a button to call a representative on a webpage of the mobile application.

Data receiving operation 430 receives data relating to the first channel communications. Data relating to the first channel communications may include the authentication information used to authenticate the user to the first channel, as well as contextual information relating to the activities of the user on the first channel (e.g., webpage, activity, etc.).

Second channel authentication operation 440 authenticates the user on the second channel using authentication information relating to the first channel communications received from data receiving operation 430. For example, the user's authenticating information provided to the mobile application (e.g., PIN) may be transmitted to the organization. These authentication credentials may be used to automatically authenticate the user to the second channel.

Figure 5:
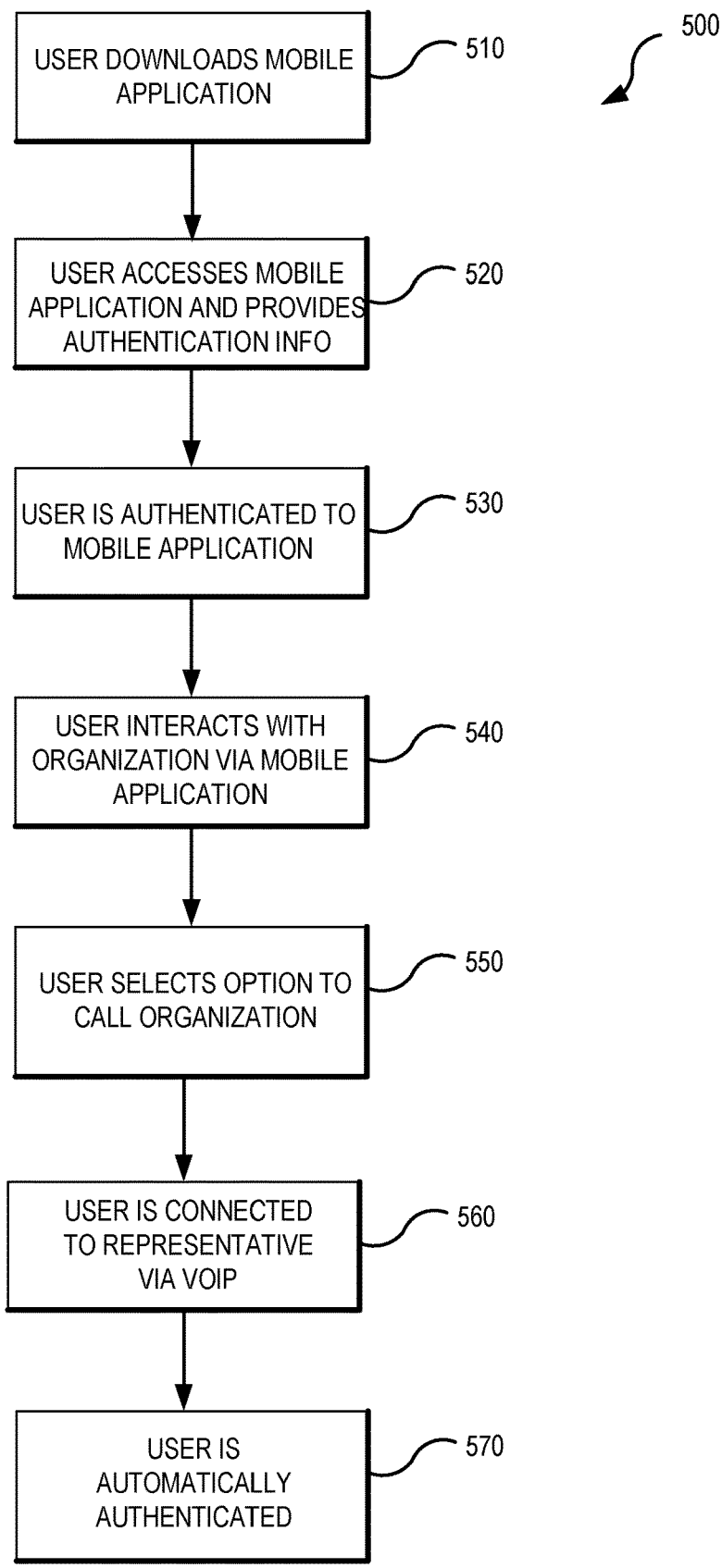
FIG. 5 is a flowchart illustrating a set of operations for authenticating a user in accordance with various embodiments of the disclosure.

FIG. 5 is a flowchart illustrating a set of operations 500 for automatically authenticating the user on a second channel during the same session. In some embodiments, fewer than all of the operations are performed, whereas in other embodiments additional operations are performed. Moreover, in some embodiments, the operations may be performed in different orders. The operations can be performed by various components in FIG. 2 and FIG. 3.

In downloading operation 510, a user downloads a mobile application to a mobile device. The application may be published on a website of an organization or otherwise available to a user. The mobile application may allow the user to engage in activities with an organization such as transfer funds, view accounts, purchase insurance, purchase securities, make trades, or otherwise manage accounts.

In accessing operation 520, the user accesses the mobile application on the mobile device and provides authentication information. In authenticating operation 530, the user is authenticated to the mobile application, allowing the user to interact with the organization using the mobile application in interacting operation 540. In selecting operation 550, the user selects an option to call the organization, initiating a voice and data call to the organization. The selection to call and the initiation of the call may be made from within the mobile application. Data in connection with the call may be sent to the organization including authentication information and/or contextual information. In connecting operation 560, the user may be connected to a representative of the organization via a voice and data call. In authentication operation 570, the user is authenticated to the voice and data call using at least a portion of the data transferred in connection with the voice and data call. It is specifically noted that operation 570 may be done prior to or substantially simultaneously with operation 560 in some embodiments.

Figure 6:
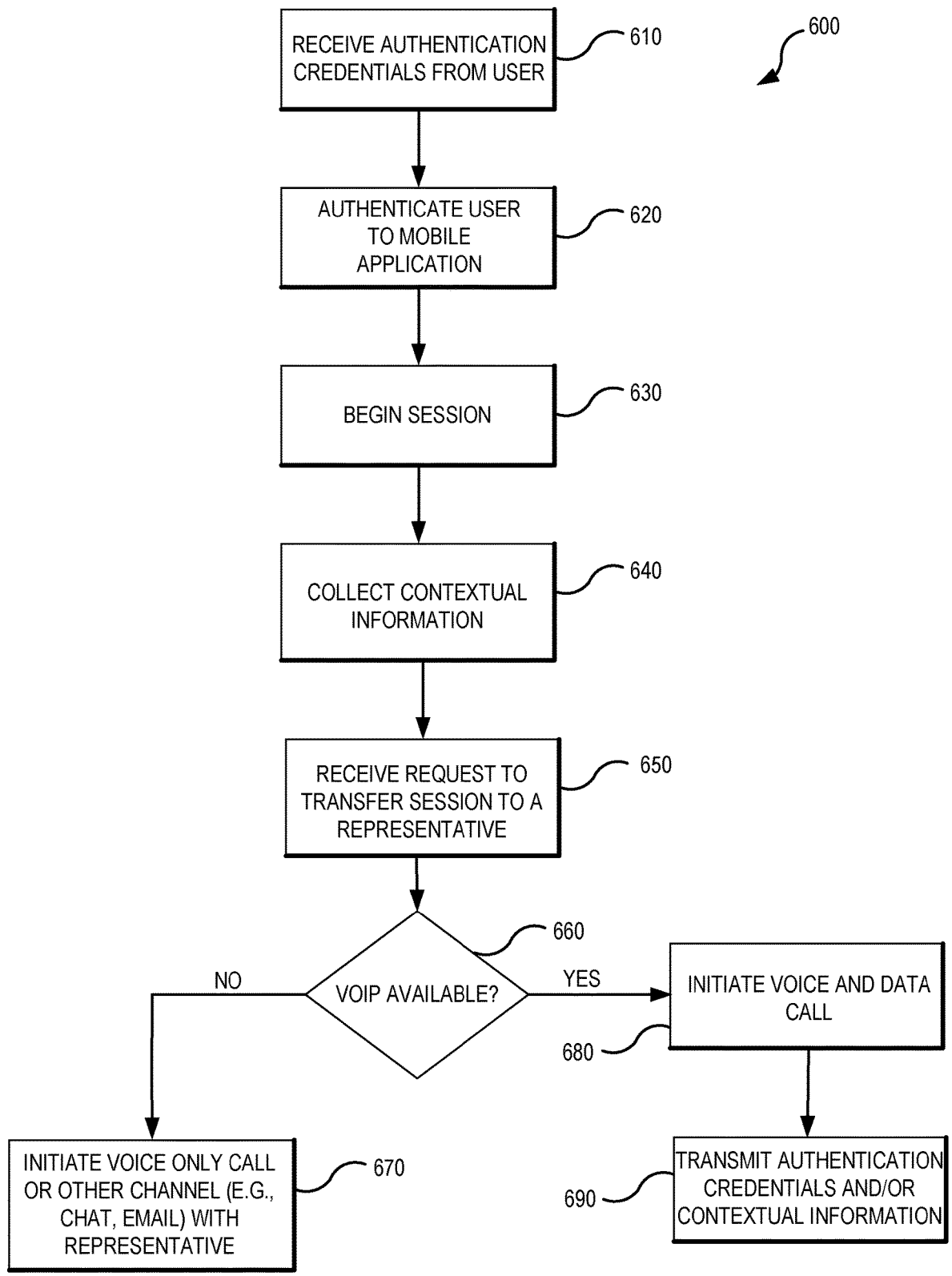
FIG. 6 is a flowchart illustrating a set of operations for authenticating a user in accordance with various embodiments of the disclosure.

FIG. 6 is a flowchart illustrating a set of operations 600 for automatically authenticating the user on a second channel during the same session. In some embodiments, fewer than all of the operations are performed, whereas in other embodiments additional operations are performed. Moreover, in some embodiments, the operations may be performed in different orders. The operations can be performed by various components in FIG. 2 and FIG. 3.

Authentication credential receiving operation 610 receives authentication information into a mobile application. The authentication information may include username/password and/or a PIN. Authenticating operation 620, the user is authenticated to the mobile application after the credentials are verified by the mobile application and/or the organization. Session initiating operation 630 begins the session after the user is authenticated to the mobile application, allowing the user to engage in activities with the organization such as view accounts, purchase securities, and the like. Contextual information collecting operation 640 collects contextual information relating to the user's session (e.g., webpage the user is viewing). Transfer request operation 650 receives a request to transfer the session to a representative via a voice and data call. The transfer request may be received by the user selecting a link or otherwise selecting an option to call a representative within the mobile application. Voice and data call availability operation 660 determines whether a voice and data call, such as a VoIP or comparable, connection is available. If not, in alternative option operation 670, a voice only call or other channel (e.g., chat, text message, email) option is provided to the user. If a VoIP connection is available, a voice and data call is initiated in initiating operation 680. Transmitting operation 690 transmits authentication credentials and/or contextual information to the organization in connection with the voice and data call.

Figure 7:
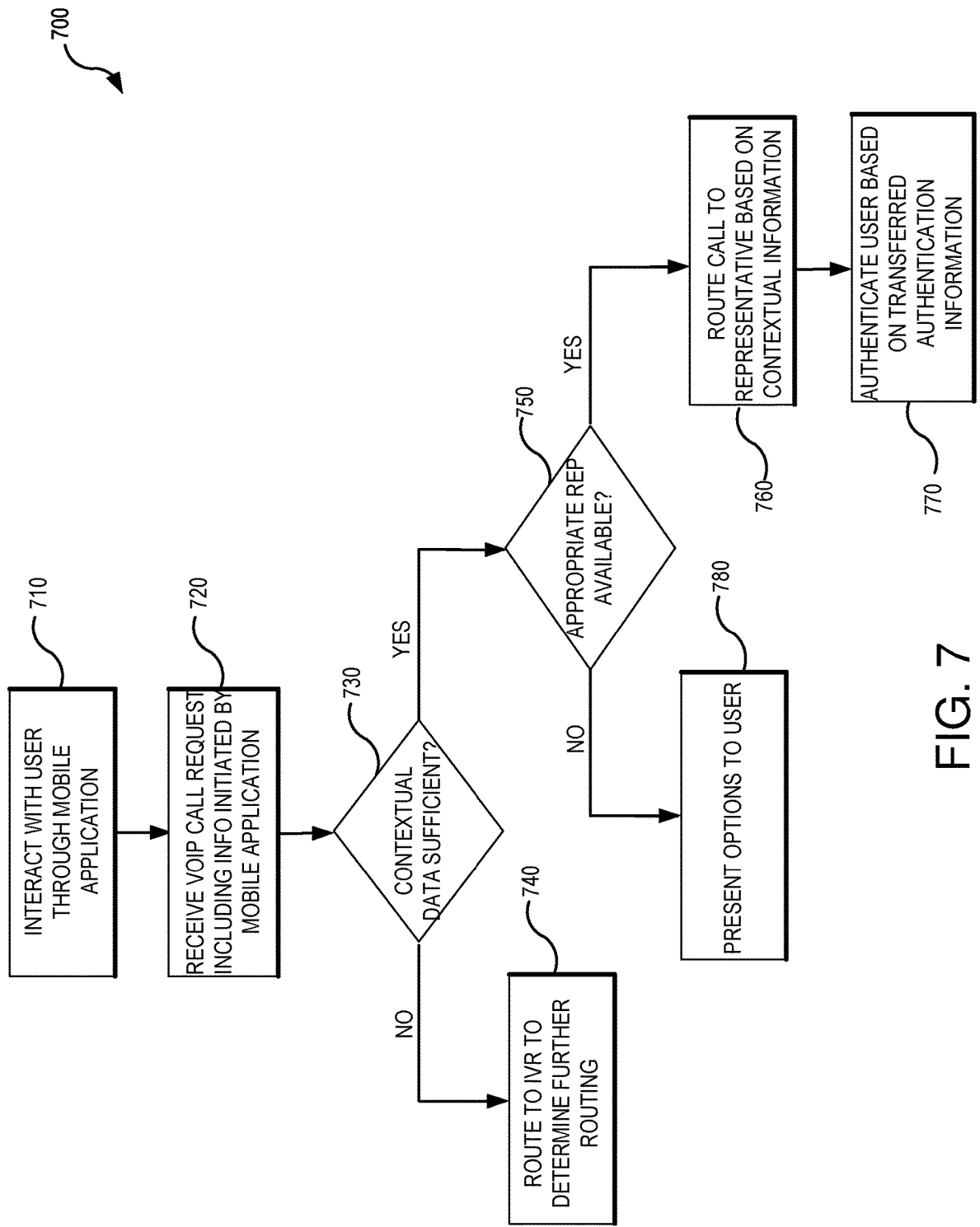
FIG. 7 is a flowchart illustrating a set of operations for authenticating a user in accordance with various embodiments of the disclosure.

FIG. 7 is a flowchart illustrating a set of operations 700 for automatically authenticating the user on a second channel during the same session. In some embodiments, fewer than all of the operations are performed, whereas in other embodiments additional operations are performed. Moreover, in some embodiments, the operations may be performed in different orders. The operations can be performed by various components in FIG. 2 and FIG. 3.

Interacting operation 710 interacts with a user through a mobile application. Such interactions may include allowing a user to view an account, set up a new account, transfer funds, etc. VoIP call request operation 720 receives a request for a VoIP call initiated from the mobile application of the user's mobile device. The request may include information such as the authentication information the user entered to authenticate to the mobile application as well as information regarding the interactions the user had with the organization prior to or while making the VoIP call to the organization.

After receiving the call request, sufficiency operation 730 determines whether the contextual information (e.g., webpage that the call was initiated from) relating to VoIP call is sufficient to determine a routing. If not, routing operation 740 routes the call to an IVR or to a common number to determine where the call should be routed. In some embodiments the call is routed to a representative who does not specialize. If the contextual data included in the VoIP call is sufficient to determine which representative the call should be forwarded to, representative availability determining operation 750 determines whether an appropriate representative is available. If the appropriate representative is determined to be unavailable, options presenting operation 780 presents options to the user such as waiting for an estimated amount of time, using a different channel, calling back, etc. If the appropriate representative is determined to be available, routing call operation 760 routes the call to the appropriate representative based on the contextual information.

Automatic authentication operation 770 authenticates the user based on the transferred authentication information or based on other information transferred in connection with the VoIP call. In some embodiments, automatic authentication operation 770 may occur after VoIP call request operation 720.

Figure 8:
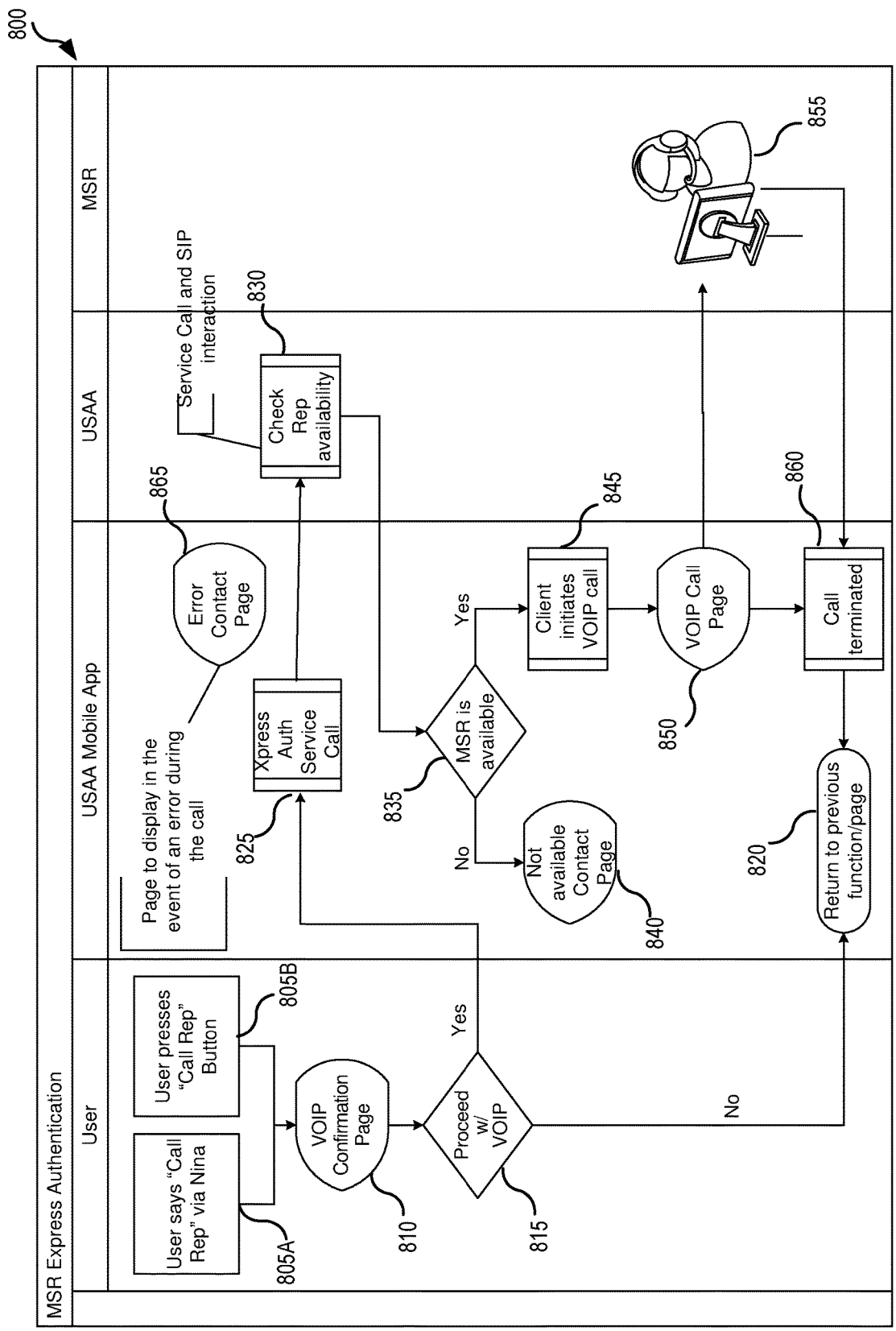
FIG. 8 is a sequence diagram illustrating an example of authenticating a user in accordance with various embodiments of the disclosure.

FIG. 8 is a sequence diagram illustrating an example of authenticating a user in accordance with various embodiments of the disclosure. The steps in the sequence diagram may be performed using some, all or none of the components described in FIGS. 2 and 3.

In sequence 805A and 805B, the user selects an option to call a representative either by stating "Call Rep" or pressing a "Call Rep" button while in a mobile application. A VoIP confirmation page is displayed (sequence 810). The user may select whether to proceed with VoIP call (sequence 815). If the user selects not to proceed with the VoIP call, the mobile application returns the user to the previous function or page that the user was accessing prior to selecting the "Call Rep" function (sequence 820).

If the user decides to proceed with the VoIP call, an Xpress Authentication service call is initiated to the organization (sequence 825). The user may be authenticated with data sent from the mobile application, and the organization may determine the representative best equipped to answer the user's call based on contextual information sent by the mobile application. The representative's availability is checked (sequence 830). The service call may provide a session initiation protocol (SIP) address that is used to initiate the call, and the SIP may return a number to call and an indication of whether the uniquely skilled representative is available. The mobile application receives an indication of the representative's availability (sequence 835). In response, the mobile application displays a page indicating that a representative is unavailable and returns the user to a contact page of the mobile application (sequence 840). If a representative is available, the mobile application initiates a VoIP session (sequence 845), which may display the VoIP mobile application page to the user (sequence 850). The mobile application/user is connected to the representative (sequence 855). After the user is finished speaking to the representative, the call is terminated (sequence 860). Upon termination, the user may be returned to the previous function or page of the mobile application (sequence 820). In some embodiments, when the user indicates that the user would like to proceed with the VoIP session (sequence 815), the mobile application may display a page indicating that an error occurred and that the call will not be made (sequence 865). This may occur if the network connection is insufficient or for other reasons. In some embodiments, if contextual information is unknown, the user may be presented with a call tree with a choice of numbers for the user to select from. This may direct the user to a uniquely skilled representative in the event that contextual information is unknown.

Figure 9:
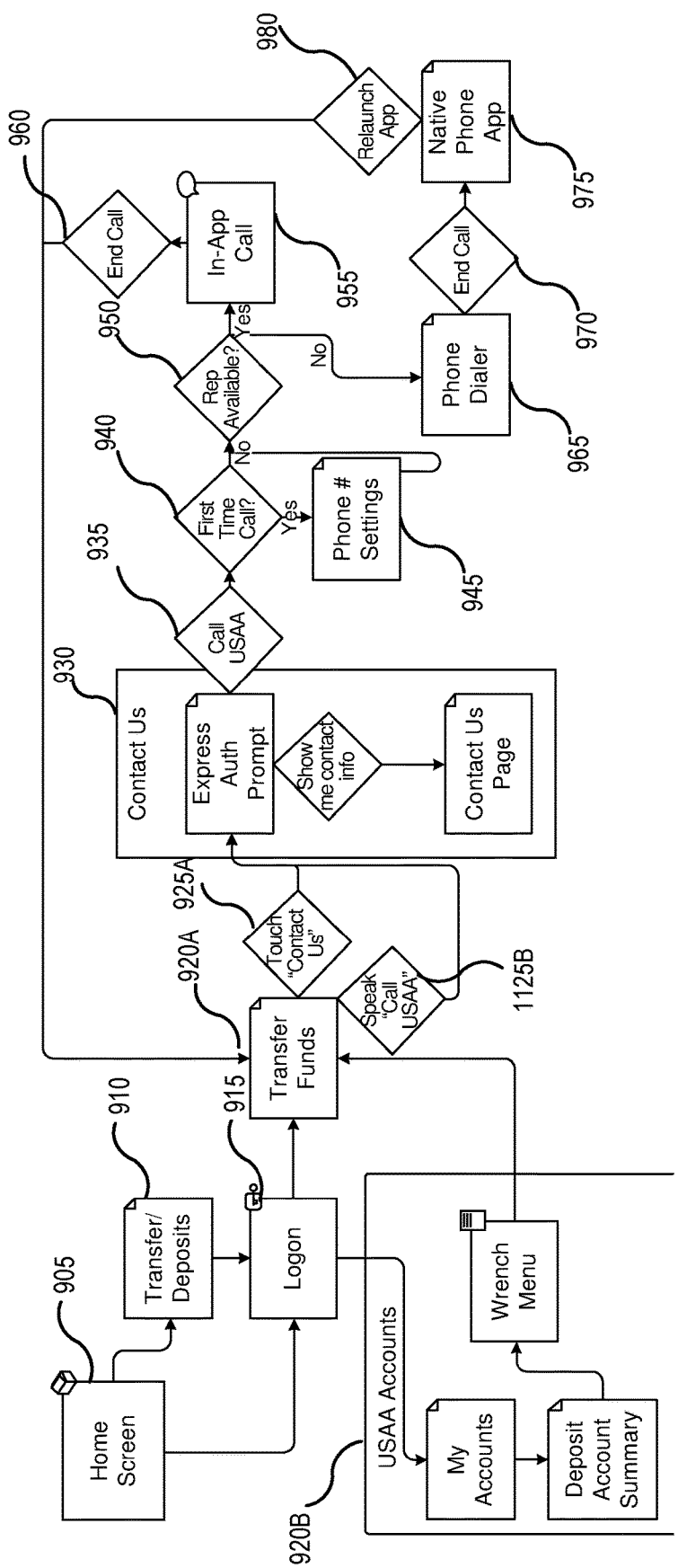
FIG. 9 is a flowchart illustrating a set of operations for authenticating a user in accordance with various embodiments of the disclosure.
Figure 10:
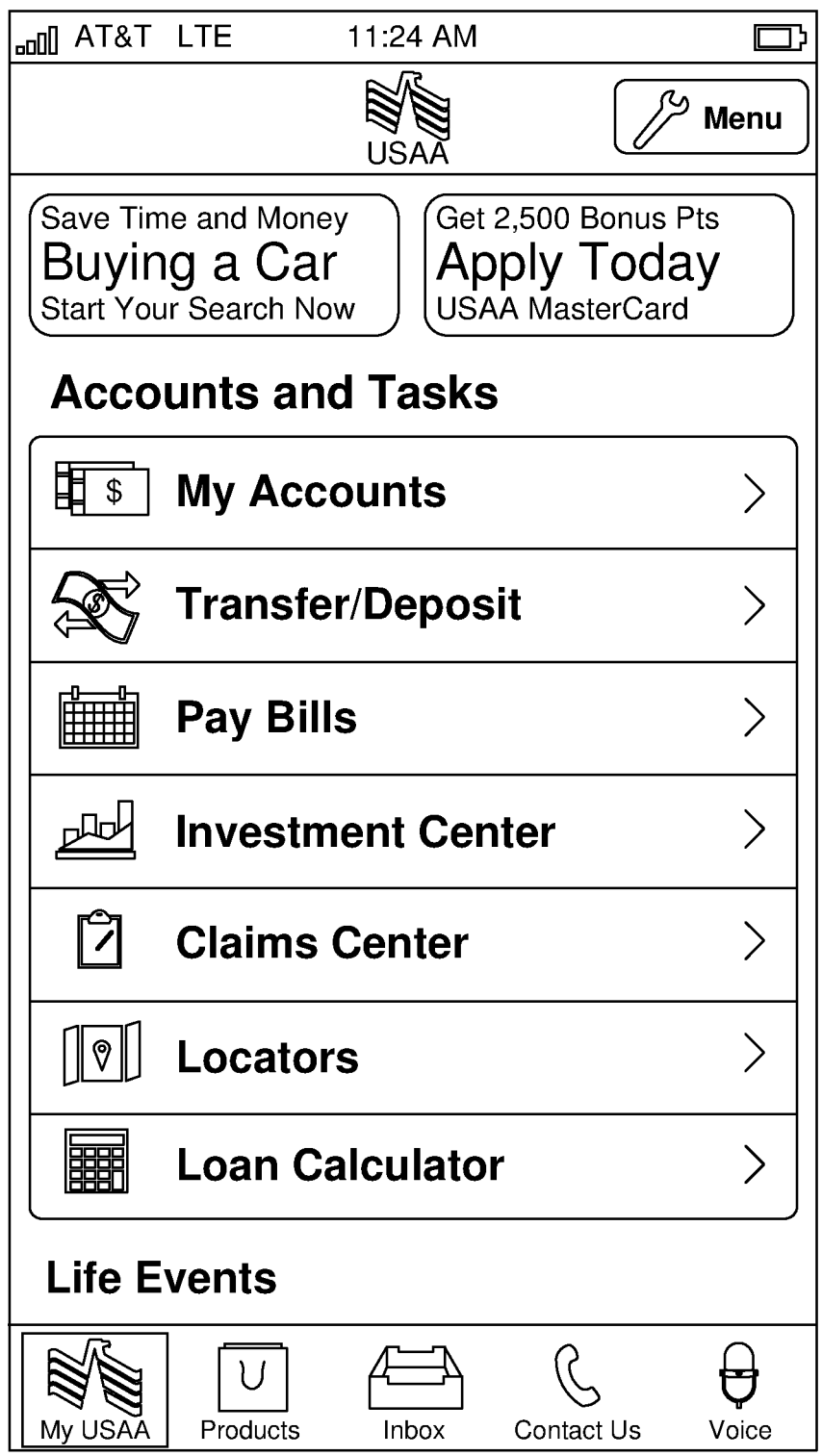
FIG. 10 illustrates an example of a user interface that may be displayed on a user device in accordance with various embodiments of the disclosure.
Figure 11:
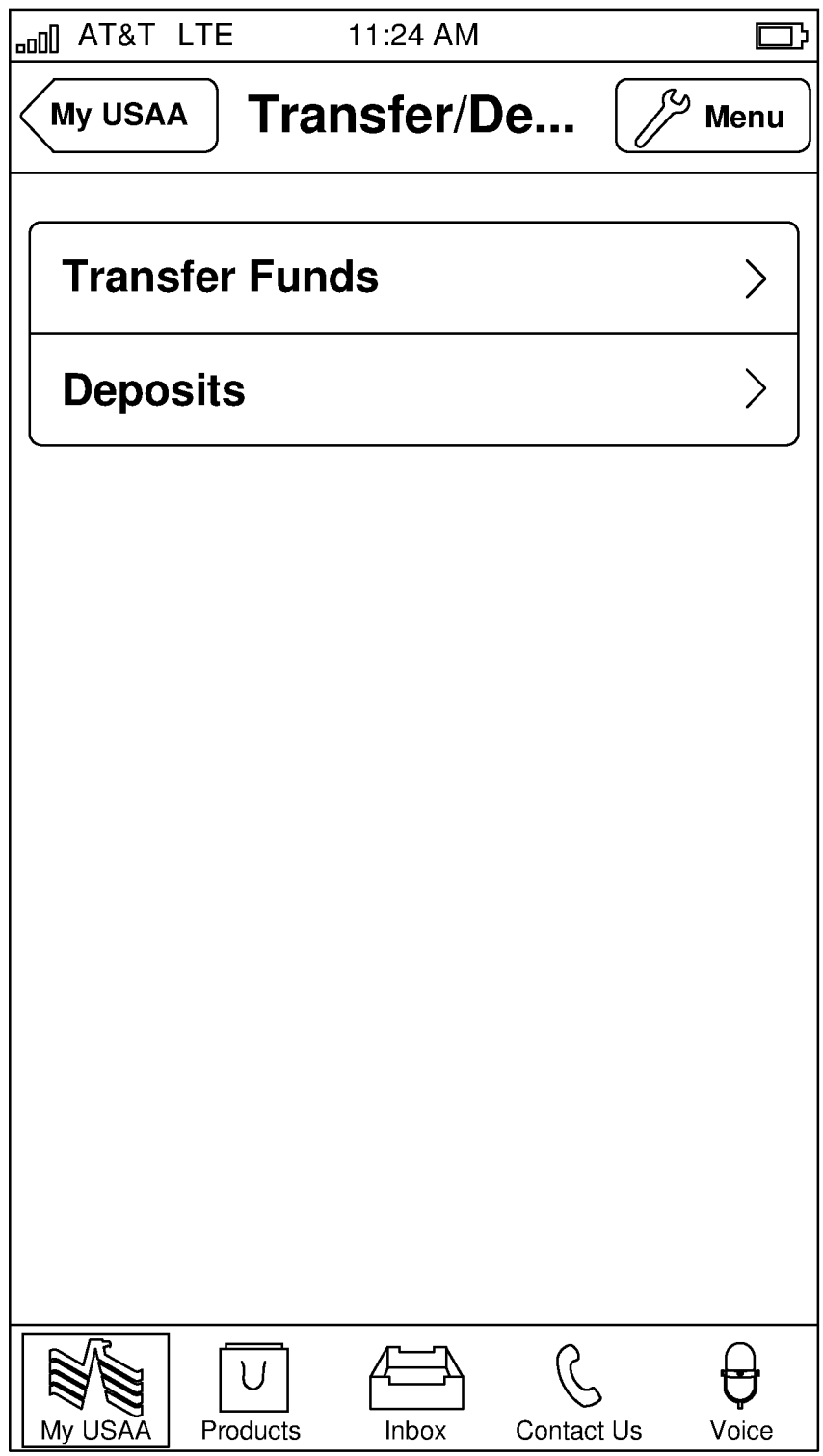
FIG. 11 illustrates an example of a user interface that may be displayed on a user device in accordance with various embodiments of the disclosure.
Figure 12:
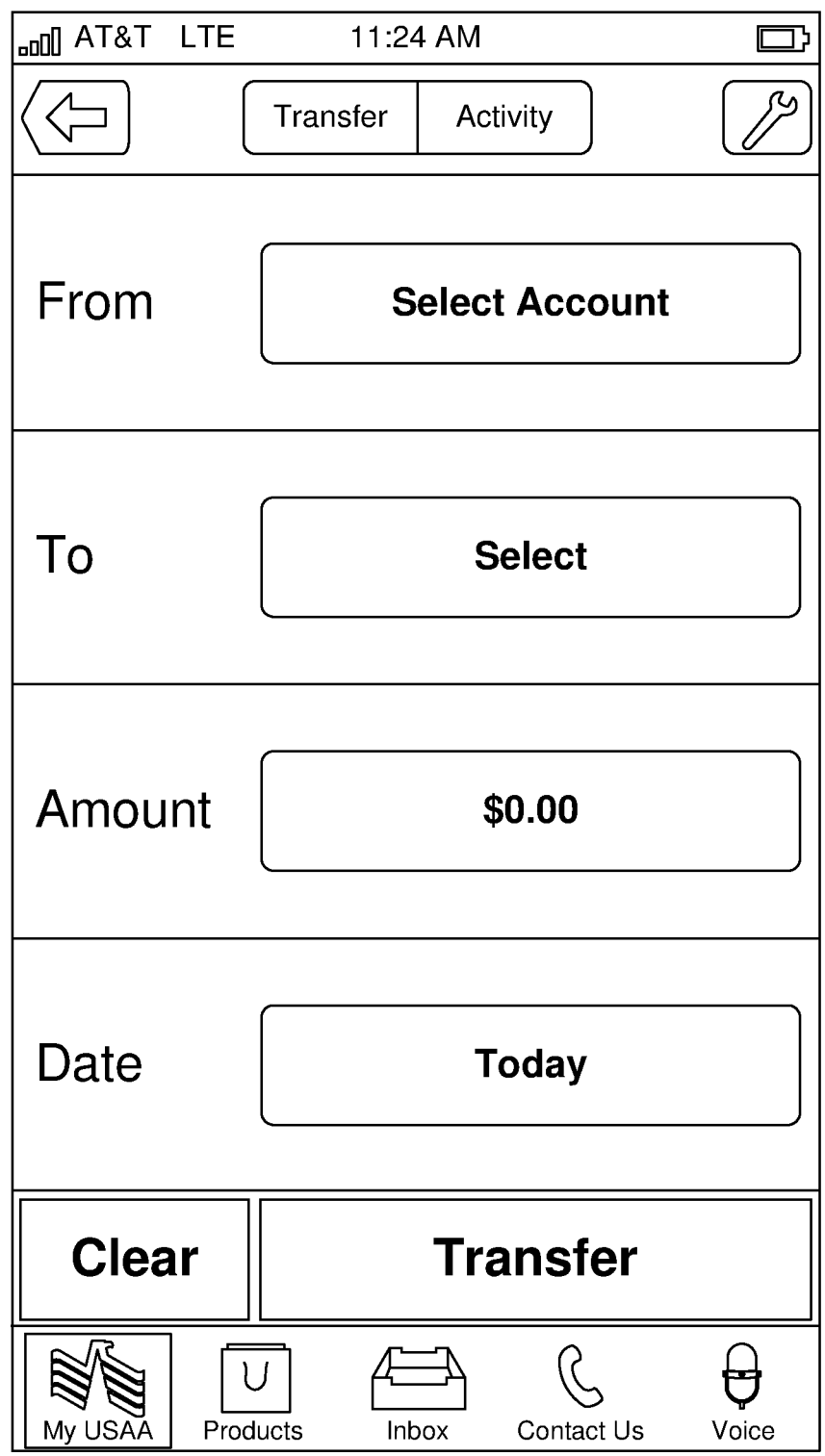
FIG. 12 illustrates an example of a user interface that may be displayed on a user device in accordance with various embodiments of the disclosure.

FIG. 9 is a diagram illustrating an example of authenticating a user in accordance with various embodiments of the disclosure. In FIG. 9, the user is presented with a home screen of a mobile application (sequence 905). An example of a home screen user interface is depicted in FIG. 10. The user may select an activity of Transfer/Deposits (sequence 910). An example of a user interface depicting this selection is shown in FIG. 11. If the user has not already been asked, the user may be asked to provide authentication information to logon to the mobile application (sequence 915). After logging on to the mobile application, the user may select Transfer Funds (sequence 920A). Alternatively, the user may view the user's accounts by selecting My Accounts, then Deposit Account Summary (sequence 920B). The user may select a menu and then an option to Transfer Funds (sequence 920A). An example of a Transfer Funds user interface is depicted in FIG. 12.

Figure 13:
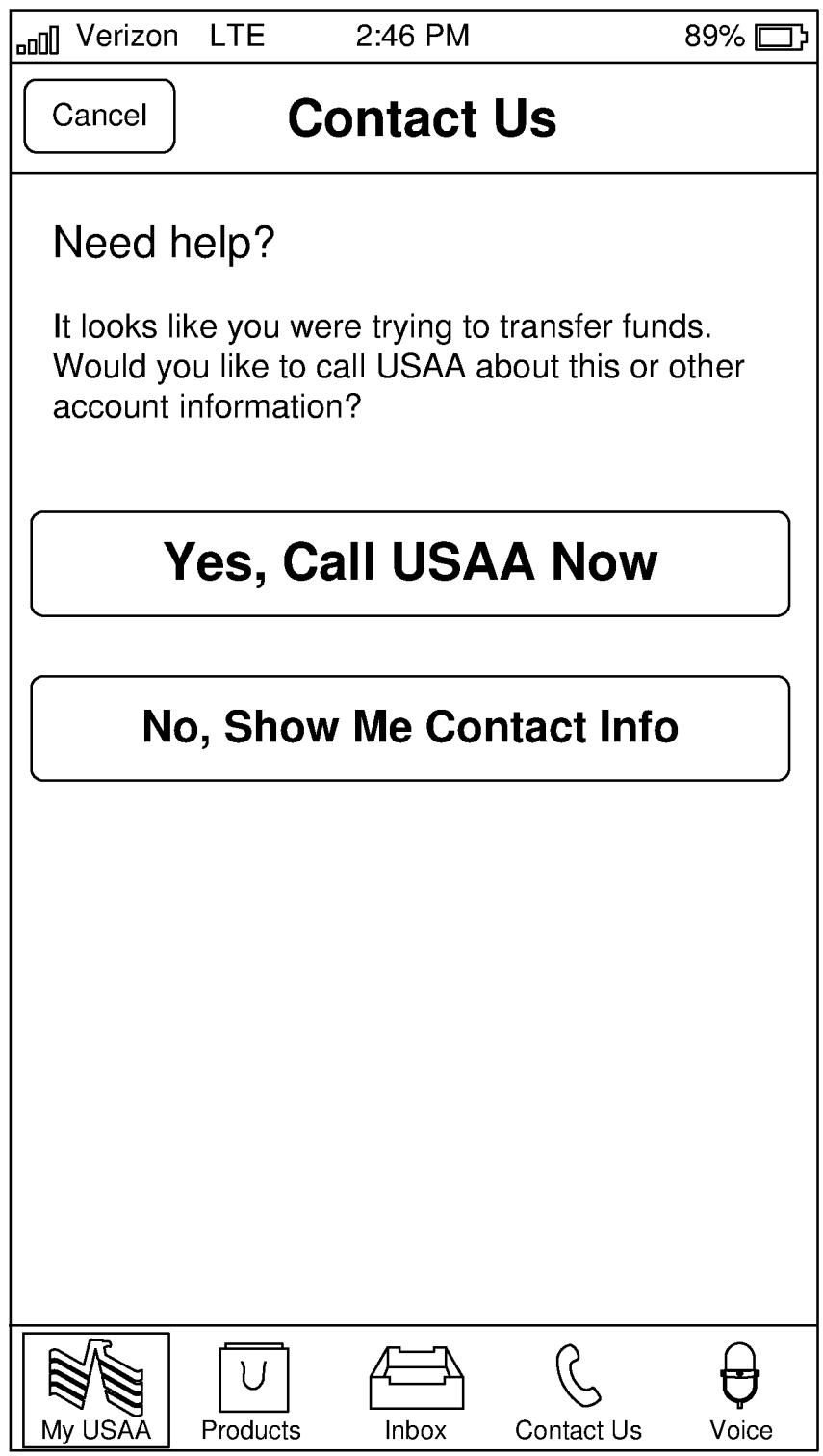
FIG. 13 illustrates an example of a user interface that may be displayed on a user device in accordance with various embodiments of the disclosure.
Figure 14:
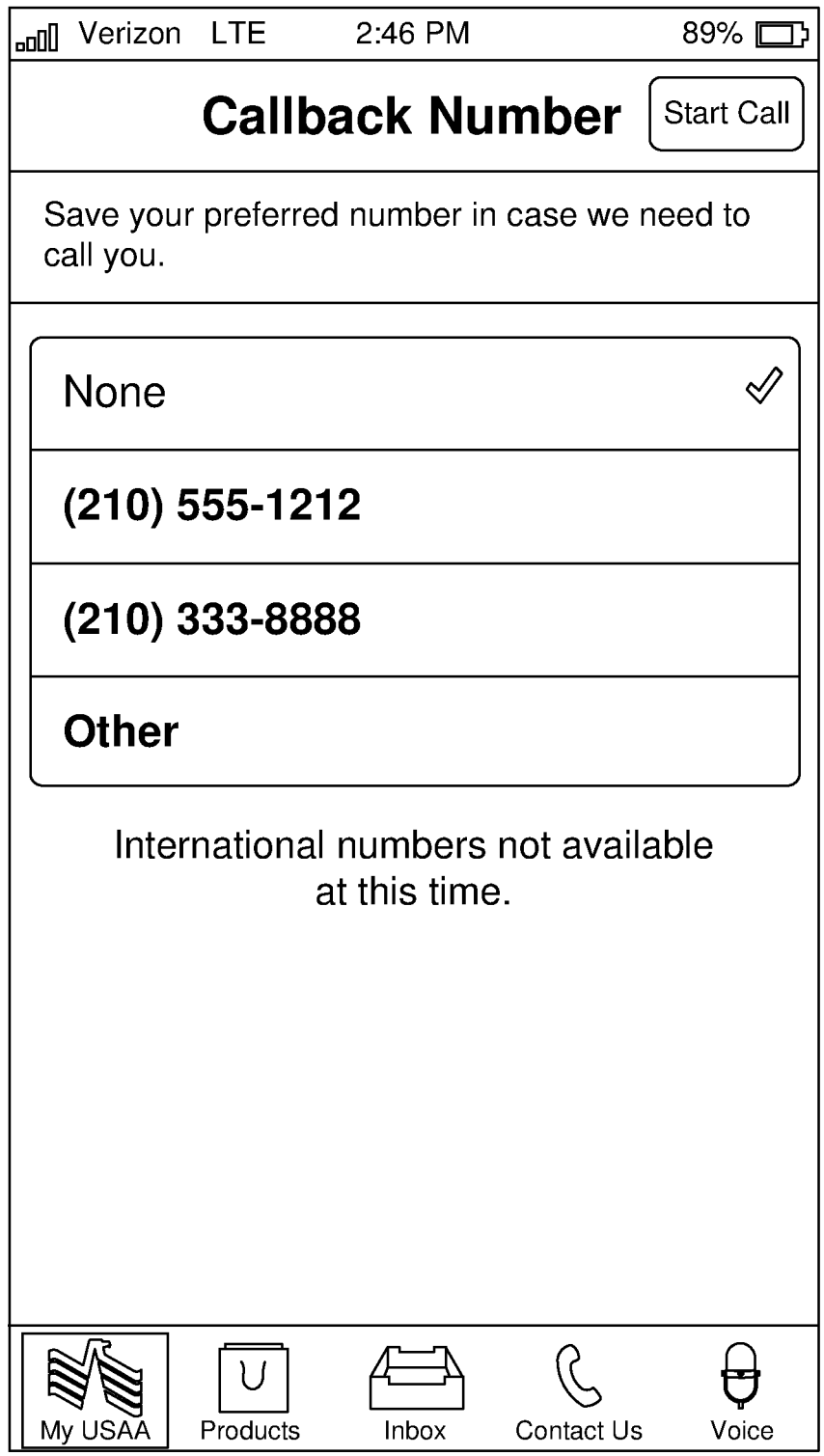
FIG. 14 illustrates an example of a user interface that may be displayed on a user device in accordance with various embodiments of the disclosure.
Figure 15:
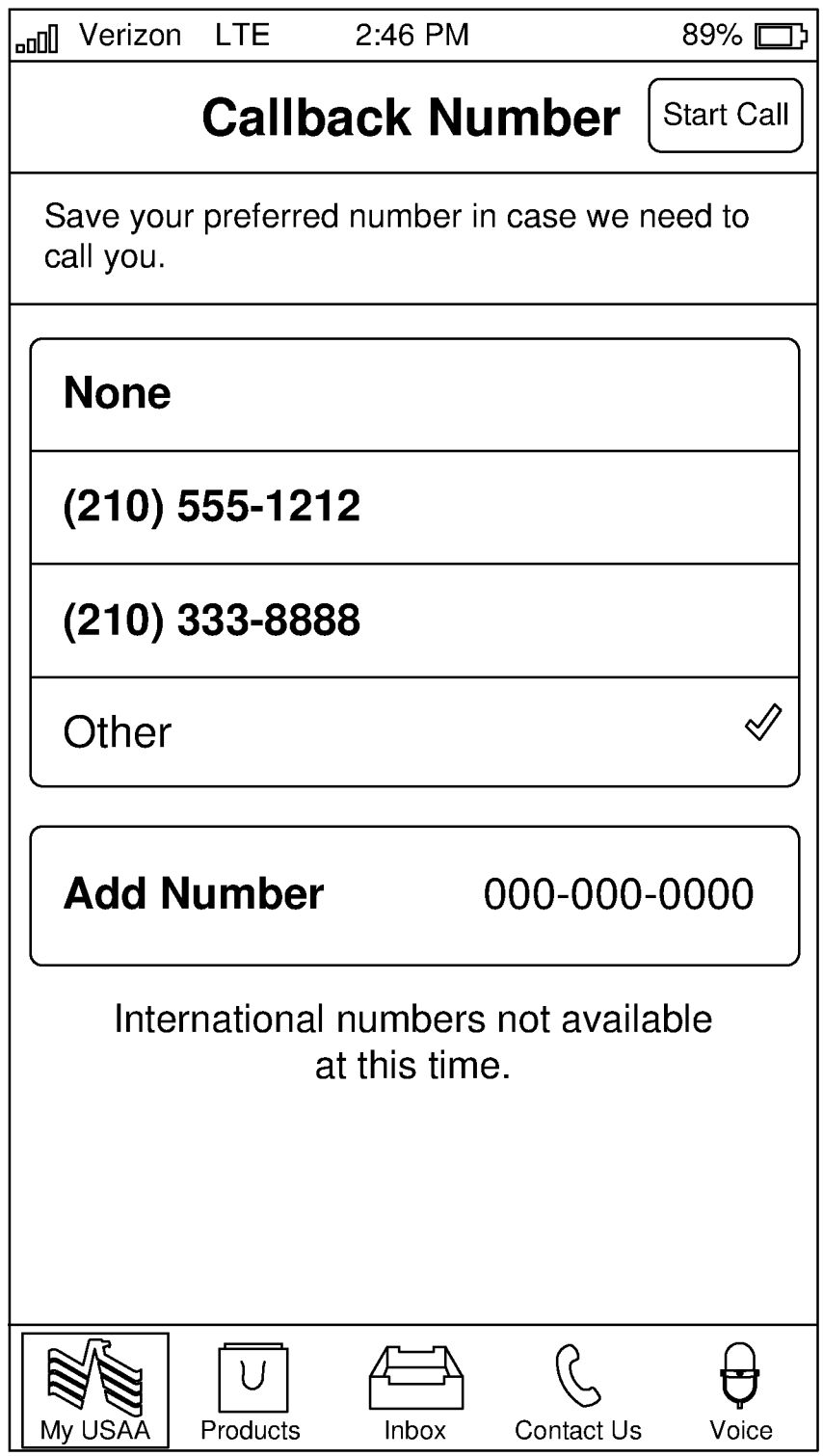
FIG. 15 illustrates an example of a user interface that may be displayed on a user device in accordance with various embodiments of the disclosure.
Figure 16:
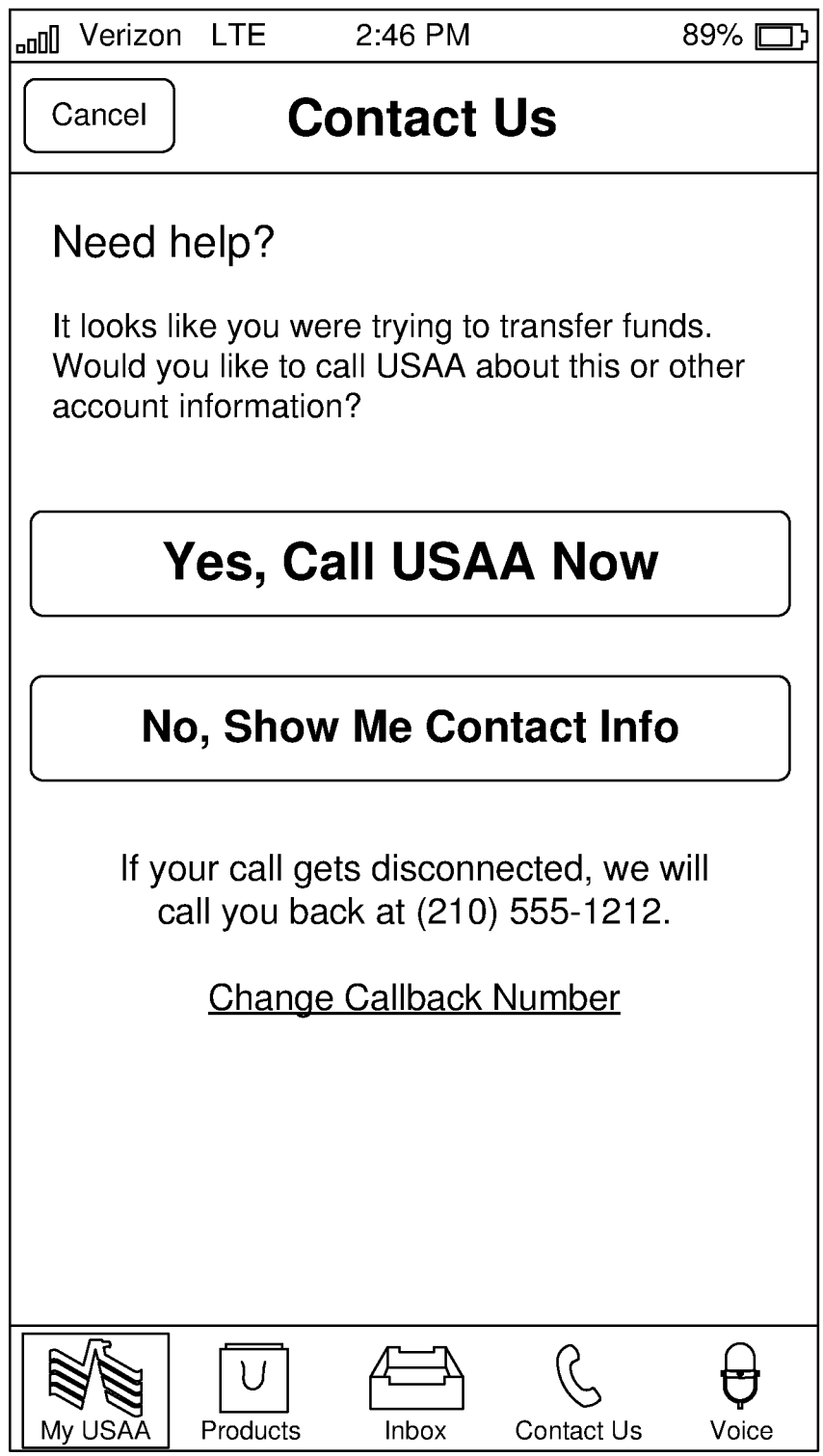
FIG. 16 illustrates an example of a user interface that may be displayed on a user device in accordance with various embodiments of the disclosure.
Figure 17:
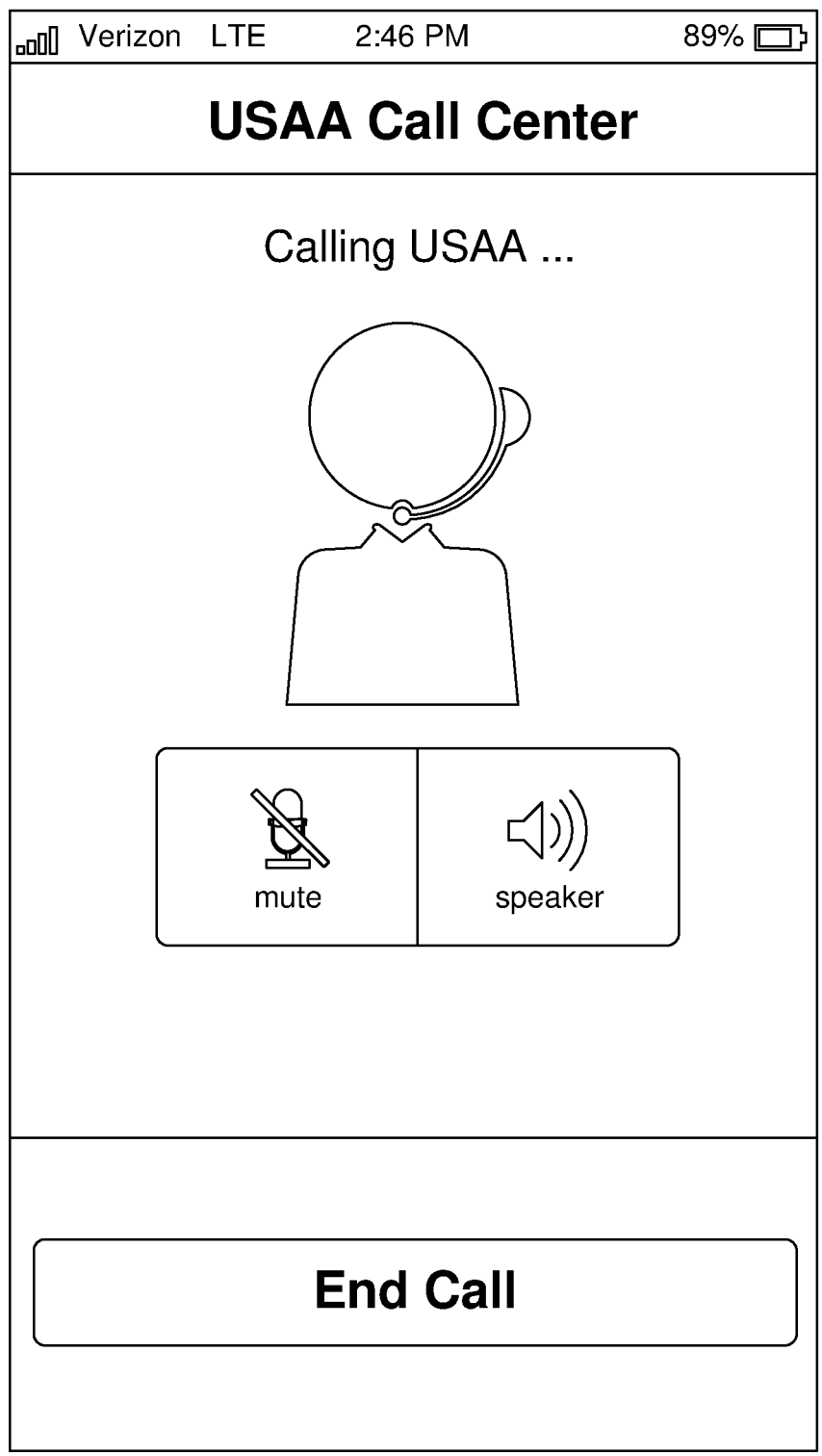
FIG. 17 illustrates an example of a user interface that may be displayed on a user device in accordance with various embodiments of the disclosure.

The user may touch "Contact Us" on the user interface (sequence 925A), or the user may speak "Call USAA" or the equivalent to call a representative (sequence 925B). In response to the selection to call a representative, a "Contact Us" page may be displayed (sequence 930). An example of a user interface displaying a "Contact Us" page is shown in FIG. 13. As shown in FIG. 13, the Contact Us page may identify the user's current activity (e.g., transfer funds). The Contact Us page may allow the user to make a selection to call the organization from within the mobile application ("Yes, Call USAA Now") or to make a selection to see contact information ("No, Show Me Contact Info"). If the user makes a selection to "Call USAA Now" (sequence 935), it is determined whether this is a first time call (sequence 940). If it is a first time call, then phone number settings are confirmed or collected (sequence 945). An example of a process confirming phone number settings is shown in FIG. 14 (confirming call-back numbers), FIG. 15 (allowing user to add another call-back number), and FIG. 16 (confirming that the organization will call the user back at the specified number if the call becomes disconnected). It is determined whether a representative is available (sequence 950). If a representative is available, a call is made from within the application (sequence 955). An example of a user interface depicting an initiation of an "in-app call" (call made from within the mobile application) is shown in FIG. 17. When the call is terminated (sequence 960), the user may be returned to the previous function or page (e.g., transfer funds page).

If a representative is unavailable, then the mobile application ends the call (sequence 965, 970). The native phone application will re-launch the application (sequence 975 and 980), and the user will be returned to the transfer funds page.

FIG. 10 through FIG. 17 depict examples of user interfaces that may be used in connection with a mobile application in accordance with various embodiments of the disclosure.

Figure 18:
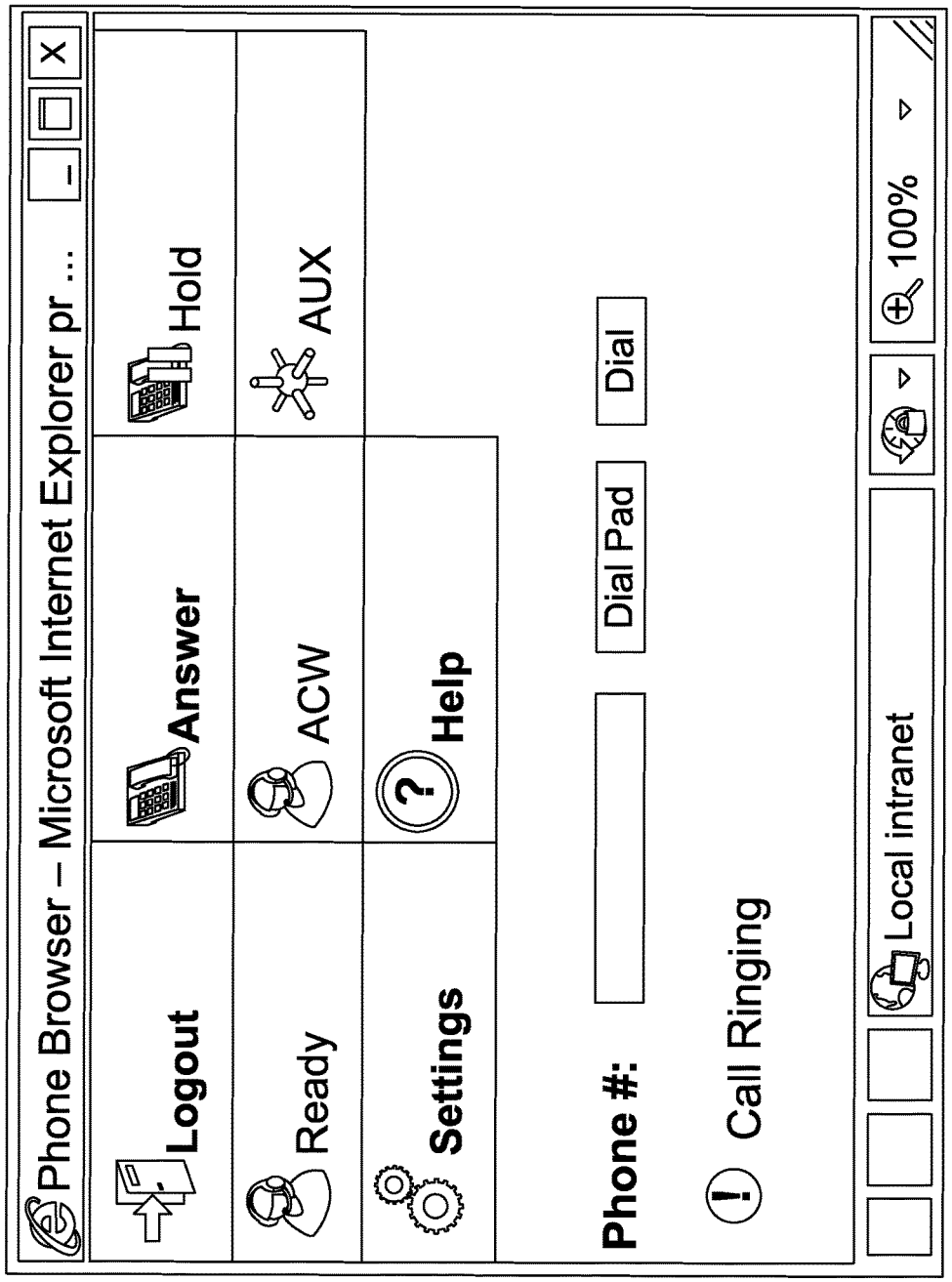
FIG. 18 illustrates an example of user interface that may be displayed on the device of a representative in accordance with various embodiments of the disclosure.
Figure 19:
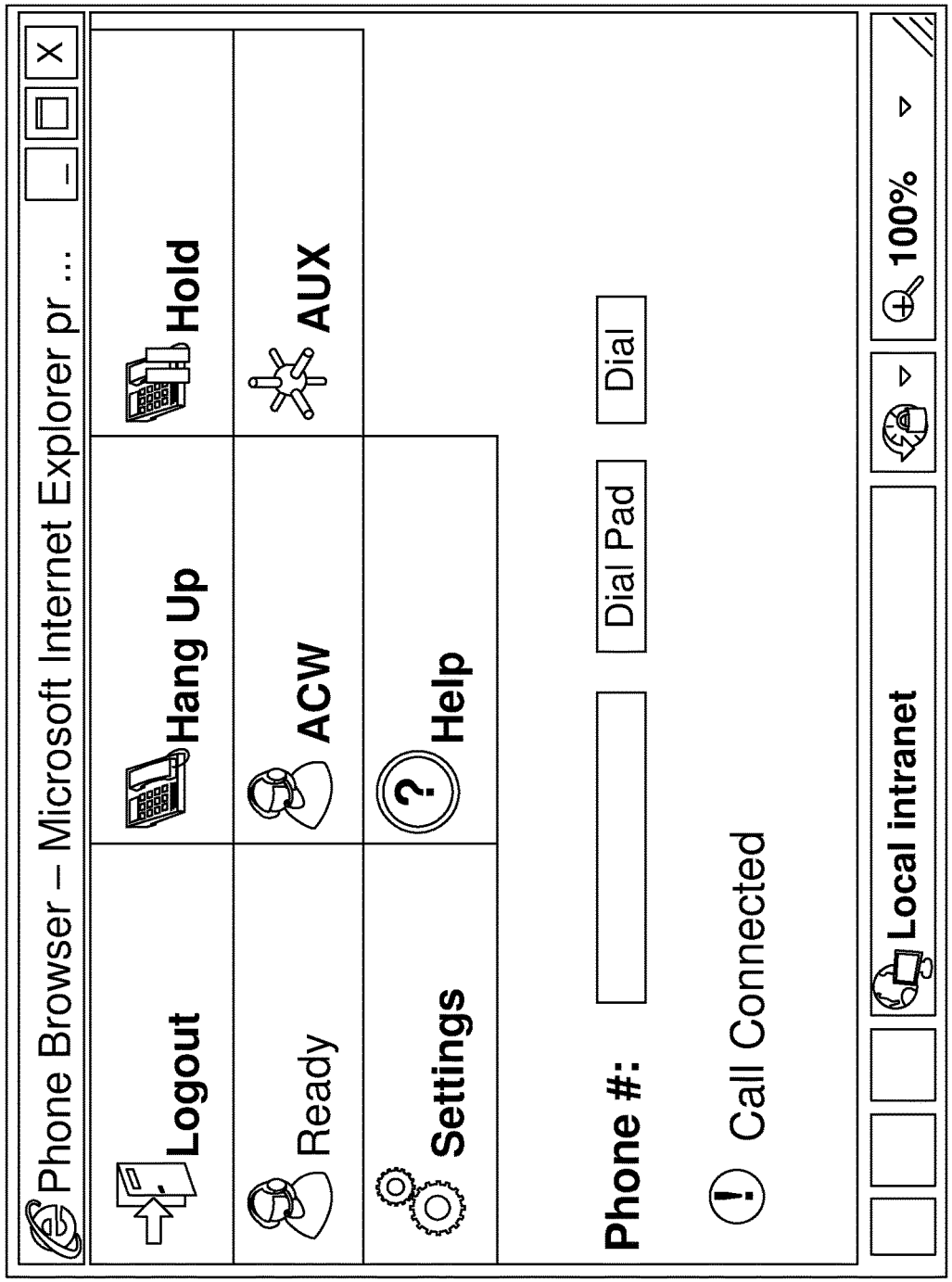
FIG. 19 illustrates an example of user interface that may be displayed on the device of a representative in accordance with various embodiments of the disclosure.
Figure 20:
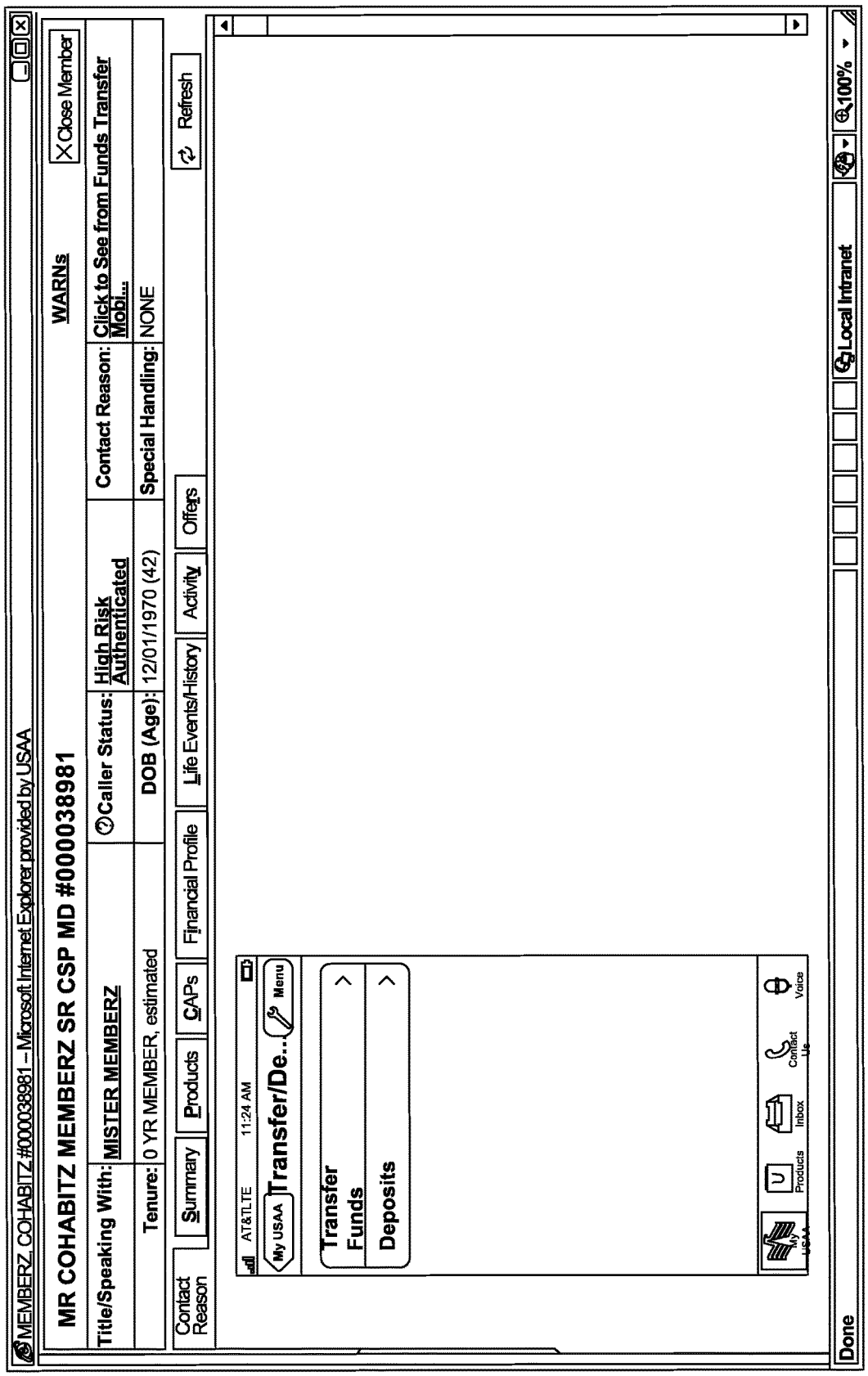
FIG. 20 illustrates an example of user interface that may be displayed on the device of a representative in accordance with various embodiments of the disclosure.
Figure 21:
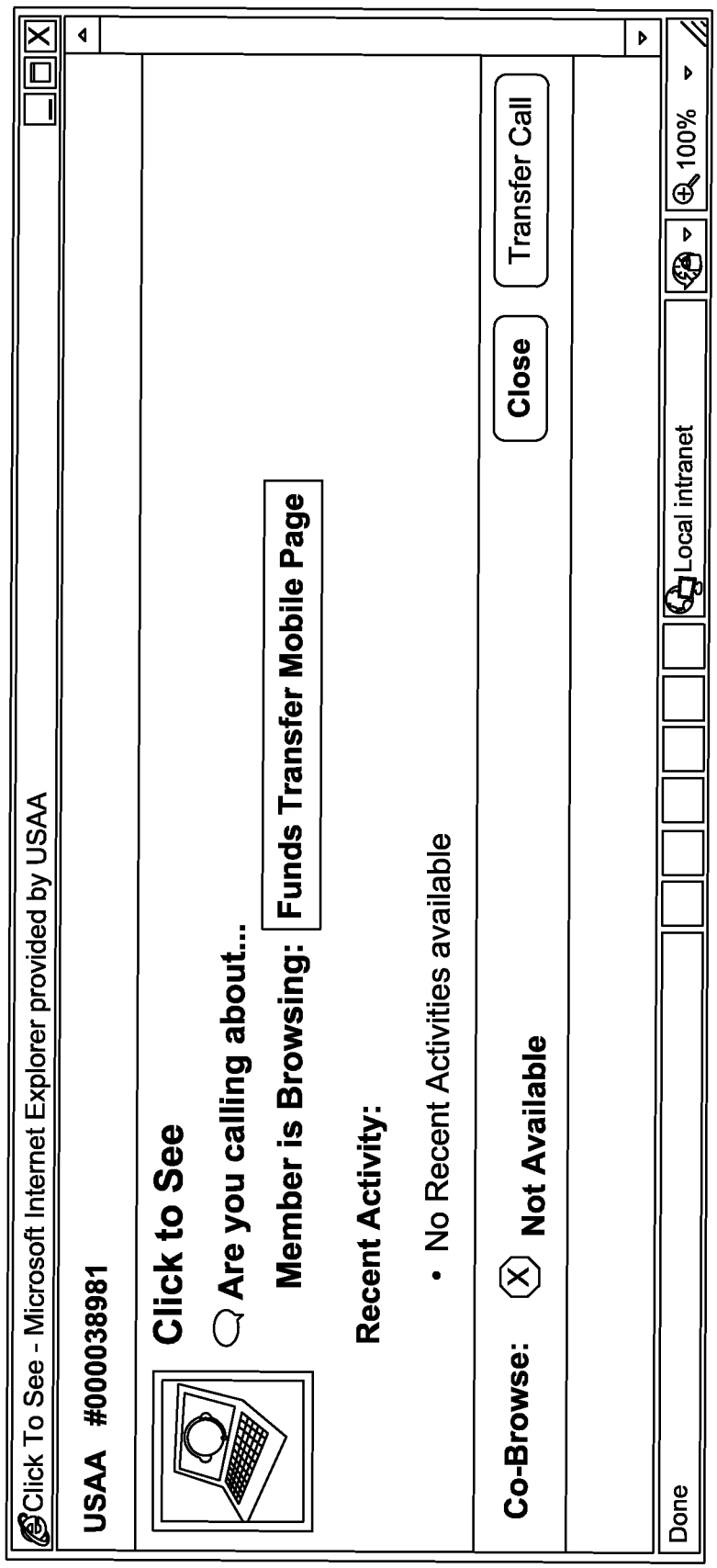
FIG. 21 illustrates an example of user interface that may be displayed on the device of a representative in accordance with various embodiments of the disclosure.

FIG. 18 through FIG. 21 depict examples of displays on a representative's workstation prior to or during a voice and data call. As discussed above, contextual information and authentication information may be provided to the representative in connection with the voice and data call. In FIG. 18, the representative may be alerted to an incoming call. In FIG. 19, the representative is alerted that the call is connected. In FIG. 20, a user interface displaying information regarding the caller and the contextual information is depicted. Additional data regarding the caller, including the caller authentication status ("High Risk Authenticated") and a contact reason (the representative can click to see), may be displayed on the user interface for the representative. If the representative chooses the click to see, shown in FIG. 21, the representative can see that the user is browsing the "Funds Transfer Mobile Page." Alternatively, or in additional to the click to see feature, the user interface may display a view or webpage that the user was viewing prior to or during the voice and data call. An indication of whether co-browsing is available may be shown as well.

Computer System Overview

Figure 22:
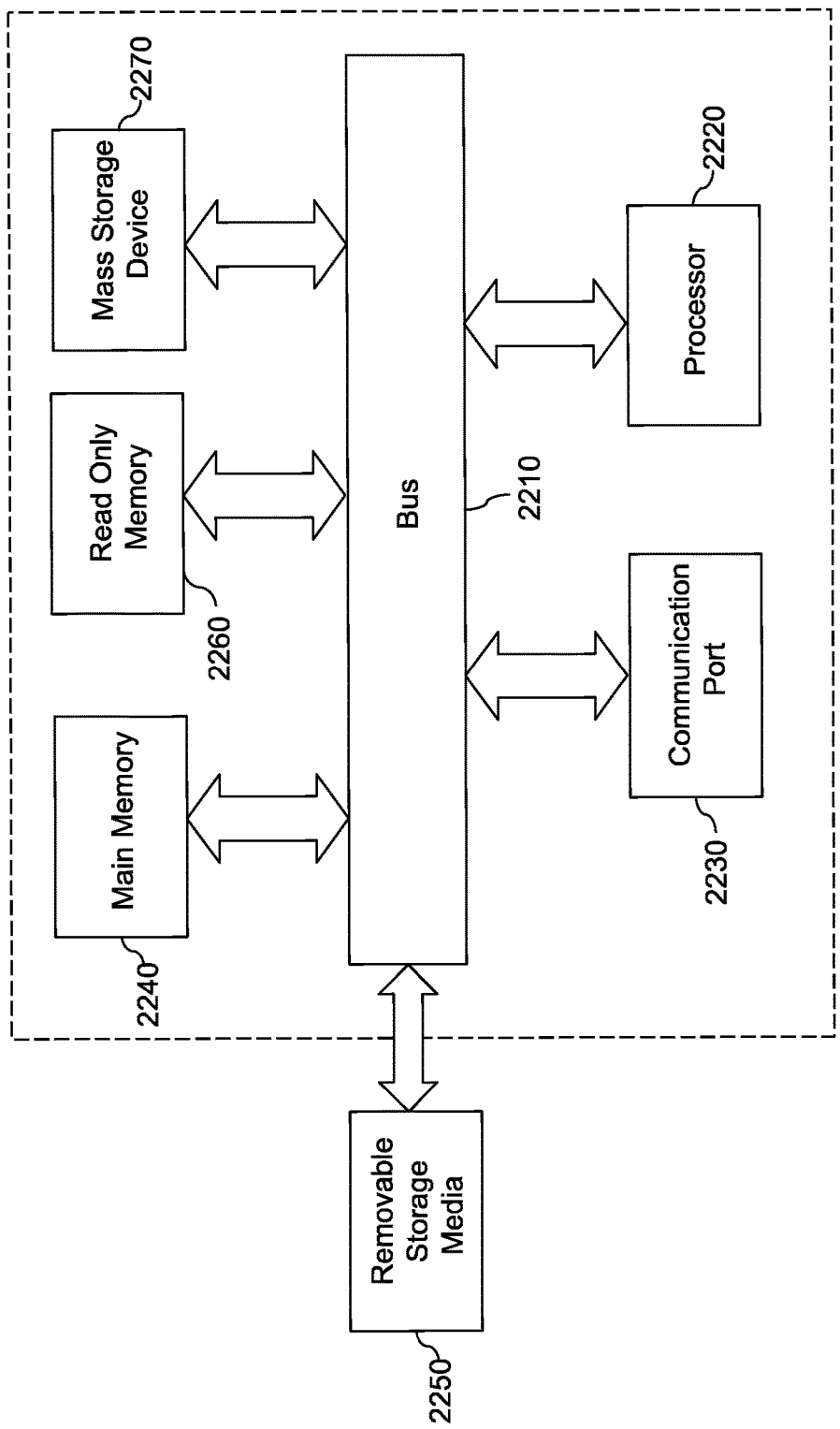
FIG. 22 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 22 is an example of a computer system 2200 with which embodiments of the present disclosure may be utilized. According to the present example, the computer system includes a bus 2210, at least one processor 2220, at least one communication port 2230, a main memory 2240, a removable storage media 2250, a read only memory 2260, and a mass storage 2270.

Processor(s) 2220 can be any known processor, such as, but not limited to, an Intel® Itanium® or Itanium 2® processor(s), or AMD® Opteron® or Athlon MP® processor(s), or Motorola® lines of processors. Communication port(s) 2230 can be any of an RS-232 port for use with a modem based dialup connection, a 10/100 Ethernet port, or a Gigabit port using copper or fiber. Communication port(s) 2230 may be chosen depending on a network such a Local Area Network (LAN), Wide Area Network (WAN), or any network to which the computer system 2200 connects.

Main memory 2240 can be Random Access Memory (RAM), or any other dynamic storage device(s) commonly known in the art. Read only memory 2260 can be any static storage device(s) such as Programmable Read Only Memory (PROM) chips for storing static information such as instructions for processor 2220.

Mass storage 2270 can be used to store information and instructions. For example, hard disks such as the Adaptec® family of SCSI drives, an optical disc, an array of disks such as RAID, such as the Adaptec family of RAID drives, or any other mass storage devices may be used.

Bus 2210 communicatively couples processor(s) 2220 with the other memory, storage and communication blocks. Bus 2210 can be a PCI/PCI-X or SCSI based system bus depending on the storage devices used.

Removable storage media 2250 can be any kind of external hard-drives, floppy drives, IOMEGA® Zip Drives, Compact Disc-Read Only Memory (CD-ROM), Compact Disc-Re-Writable (CD-RW), Digital Video Disc-Read Only Memory (DVD-ROM). The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure and may be included in more than one embodiment of the present disclosure. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present disclosure may be provided as a computer program product which may include a machine-readable medium having stored thereon instructions which may be used to program a computer (or other electronic devices) to perform a process. The machine-readable medium may include, but is not limited to, floppy diskettes, optical discs, compact disc read-only memories (CD-ROMs), and magneto-optical discs, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present disclosure may also be downloaded as a computer program product, wherein the program may be transferred from a remote computer to a requesting computer by way of data signals embodied in a carrier wave or other propagation medium via a communication link (e.g., a modem or network connection).

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods and arrangements for multiple channel authentication. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method comprising:
    receiving a request to initiate a session with an organization over a first channel, the request initiated within an application on a device associated with a user;
    transferring the session from the first channel to a second channel, the transferring of the session initiated from within the application, wherein the application allows the user to engage in an activity through the application after authentication,
        wherein transferring the session from the first channel to the second channel includes:
            transferring, from the first channel to the second channel, A) authentication information associated with the request and B) an indication of the activity, to allow pass-through authentication to the organization, wherein the authentication information provides a level of authentication for the user;
    comparing the level of authentication from the authentication information with a level of authentication required for the activity; and
    determining, based on the comparison, that additional authentication information is required to complete the activity, wherein:
        responsive to determining that the additional authentication information is required to complete the activity, a request for the additional authentication information is sent over the second channel.

2. The method of claim 1, further comprising:
    indicating, to the user, that a representative of the organization could not be contacted via the second channel; and
    presenting, to the user, additional channels for the user to communicate with the organization, wherein the additional channels include at least one of: text messaging, chat, web, video call, or electronic mail.

3. The method of claim 1, wherein the first channel is a call, wherein the call is routed to a representative specializing in a subject matter associated with a specific tab within the application.

4. The method of claim 1, wherein the transferring the session is initiated via an icon to contact a representative, and wherein the icon is located on a specific tab within the application.

5. The method of claim 1, further comprising collecting data related to an existing or prior activity, wherein the data related to the existing or prior activity comprises at least one of: media relating to the activities or a webpage or view the user was accessing within the application.

6. The method of claim 5, wherein the first channel is a call, wherein the call is routed to a representative based on a content of the data related to the existing or prior activity the user was engaging in on the device.

7. The method of claim 6, further comprising determining an assumption of user intent based on predictive analytics, wherein routing the call to a representative is further based on the assumption of the user intent.

8. A non-transitory computer-readable storage medium containing a set of instructions that, when executed by one or more processors, cause a machine to:
    receive a request to initiate a session with an organization over a first channel, the request initiated within an application on a device associated with a user;
    transfer the session from the first channel to a second channel, the transferring of the session initiated from within the application, wherein the application allows the user to engage in an activity through the application after authentication, wherein transferring the session from the first channel to the second channel includes:

transferring, from the first channel to the second channel, A) authentication information associated with the request and B) an indication of the activity, to allow pass-through authentication to the organization, wherein the authentication information provides a level of authentication for the user;

compare the level of authentication from the authentication information with a level of authentication required for the activity; and determine, based on the comparison, that additional authentication information is required to complete the activity, wherein:

responsive to determining that the additional authentication information is required to complete the activity, a request for the additional authentication information is sent over the second channel.

9. The non-transitory computer-readable storage medium of claim 8, wherein the set of instructions, when executed by the one or more processors, further causes the machine to:

indicate, to the user, that a representative of the organization could not be contacted via the second channel; and present, to the user, additional channels for the user to communicate with the organization, wherein the additional channels include at least one of: text messaging, chat, web, video call, or electronic mail.

10. The non-transitory computer-readable storage medium of claim 8, wherein the first channel is a call, wherein the call is routed to a representative specializing in a subject matter associated with a specific tab in the application.

11. The non-transitory computer-readable storage medium of claim 8, wherein the transfer is initiated via an icon to contact a representative, and wherein the icon is located on the specific tab in the application.

12. The non-transitory computer-readable storage medium of claim 8, wherein the first channel is a call, wherein the call is routed to a representative based on a content of data related to an existing or prior activity the user was engaging in on the device, wherein the data related to the existing or prior activity comprises at least one of: media relating to the activities or a webpage or view the user was accessing within the application.

13. The non-transitory computer-readable storage medium of claim 8, wherein the set of instructions, when executed by the one or more processors, further causes the machine to: determine an assumption of user intent based on predictive analytics, wherein routing the call to a representative is further based on the assumption of the user intent.

14. A system comprising:

a memory; and a processor in communication with the memory, the processor operable to execute software modules, the software modules comprising:

a channel communication module configured to:

receive a request to initiate a session with an organization over a first channel, the request initiated within an application on a device associated with a user, and transfer the session from the first channel to a second channel, the transferring of the session initiated from within the application, wherein the application allows the user to engage in an activity through the application after authentication, wherein transferring the session from the first channel to the second channel includes:

transferring, from the first channel to the second channel, A) authentication information associated with the request and B) an indication of the activity, to allow pass-through authentication to the organization, wherein the authentication information provides a level of authentication for the user;

a router configured to:

compare the level of authentication with a level of authentication required for the activity, and determine, based on the comparison, that additional authentication information is required to complete the activity, wherein:

responsive to determining that the additional authentication information is required to complete the activity, a request for the additional authentication information is sent over the second channel.

15. The system of claim 14, wherein the first channel is a call, wherein the call is routed to a representative specializing in a subject matter associated with a specific tab in the application, wherein the transfer is initiated via an icon to contact the representative, wherein the icon is located on the specific tab.

16. The system of claim 14, wherein the first channel is a call, wherein the call is routed to a representative based on a content of data related to an existing or prior activity the user was engaging in on the device, wherein the data related to the existing or prior activity comprises at least one of: media relating to the activities or a webpage or view the user was accessing within the application.

* * * * *